US012418874B2

(12) United States Patent
Zhou et al.

(10) Patent No.: US 12,418,874 B2
(45) Date of Patent: Sep. 16, 2025

(54) TIMING ADVANCE VALIDATION TECHNIQUES FOR L1/L2 INTER-CELL MOBILITY

(71) Applicant: QUALCOMM Incorporated, San Diego, CA (US)

(72) Inventors: Shanyu Zhou, San Diego, CA (US); Jelena Damnjanovic, Del Mar, CA (US); Tao Luo, San Diego, CA (US); Changhwan Park, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 521 days.

(21) Appl. No.: 17/822,084

(22) Filed: Aug. 24, 2022

(65) Prior Publication Data

US 2024/0073843 A1    Feb. 29, 2024

(51) Int. Cl.
*H04W 24/10* (2009.01)
*H04L 5/00* (2006.01)
*H04W 56/00* (2009.01)

(52) U.S. Cl.
CPC ......... *H04W 56/005* (2013.01); *H04L 5/0051* (2013.01); *H04W 24/10* (2013.01)

(58) Field of Classification Search
CPC ........... H04W 72/085; H04W 72/0446; H04W 56/005; H04W 76/20; H04W 24/10; H04W 64/00; H04W 72/044; H04W 72/08; H04L 5/0051; H04L 5/005

See application file for complete search history.

(56) References Cited

U.S. PATENT DOCUMENTS

| 11,071,172 | B2 * | 7/2021 | He ................... H04W 52/0251 |
| 2016/0112977 | A1 * | 4/2016 | Byun ................ H04W 72/541 370/350 |
| 2016/0285932 | A1 * | 9/2016 | Thyamagundalu ........................ H04L 12/4633 |
| 2022/0007314 | A1 | 1/2022 | Damnjanovic et al. |

(Continued)

FOREIGN PATENT DOCUMENTS

| WO | 2022035762 A1 | 2/2022 |
| WO | 2022130207 A1 | 6/2022 |

OTHER PUBLICATIONS

International Search Report and Written Opinion—PCT/US2023/028735—ISA/EPO—Nov. 28, 2023.

(Continued)

*Primary Examiner* — Wei Zhao
(74) *Attorney, Agent, or Firm* — Procopio, Cory, Hargreaves & Savitch LLP

(57) ABSTRACT

A method of wireless communication at a UE is disclosed herein. The method includes transmitting, at a first time instance, an indication of a first measurement on at least one DL-RS associated with a first cell, where the first cell is included in a L1 mobility configured cell set or a L2 mobility configured cell set. The method includes receiving, at a second time instance after the first time instance, an estimated TA associated with the first cell. The method includes performing a second measurement on the at least one DL-RS. The method includes accepting or rejecting the estimated TA for communication with the first cell based on at least one of the first measurement or the second measurement.

30 Claims, 16 Drawing Sheets

(56) References Cited

U.S. PATENT DOCUMENTS

2022/0329303 A1* 10/2022 Rahman ............... H04L 5/0048
2022/0400527 A1* 12/2022 Yoon .................... H04W 76/23

OTHER PUBLICATIONS

Mediatek Inc: "Candidate Solutions for L1/L2-based Inter-cell Mobility", 3GPP TSG-RAN WG2 Meeting #119-e, R2-2206983, 3rd Generation Partnership Project, Mobile Competence Centre, 650, Route Des Lucioles, F-06921 Sophia-Antipolis Cedex, France, vol. RAN WG2, No. Online, Aug. 17, 2022-Aug. 29, 2022, Aug. 10, 2022, 9 Pages, XP052260307, Section 2.

* cited by examiner

TIMING ADVANCE VALIDATION TECHNIQUES FOR L1/L2 INTER-CELL MOBILITY

TECHNICAL FIELD

The present disclosure relates generally to communication systems, and more particularly, to timing advances (TAs).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus for wireless communication at a user equipment (UE) are provided. The apparatus includes a memory and at least one processor coupled to the memory and based at least in part on information stored in the memory, the at least one processor is configured to: transmit, at a first time instance, an indication of a first measurement on at least one downlink reference signal (DL-RS) associated with a first cell, where the first cell is included in a layer 1 (L1) mobility configured cell set or a layer 2 (L2) mobility configured cell set; receive, at a second time instance after the first time instance, an estimated timing advance (TA) associated with the first cell; perform a second measurement on the at least one DL-RS; and accept or reject the estimated TA for communication with the first cell based on at least one of the first measurement or the second measurement.

In an aspect of the disclosure, a method, a computer-readable medium, and an apparatus for wireless communication at a network entity are provided. The apparatus includes a memory and at least one processor coupled to the memory and based at least in part on information stored in the memory, the at least one processor is configured to: receive, at a first time instance, an indication of a first measurement on at least one downlink reference signal (DL-RS) associated with a first cell, where the first cell is included in a layer 1 (L1) mobility configured cell set or a layer 2 (L2) mobility configured cell set; estimate a timing advance (TA) associated with the first cell based on the first measurement on the at least one DL-RS; and transmit, at a second time instance after the first time instance, the estimated TA associated with the first cell.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
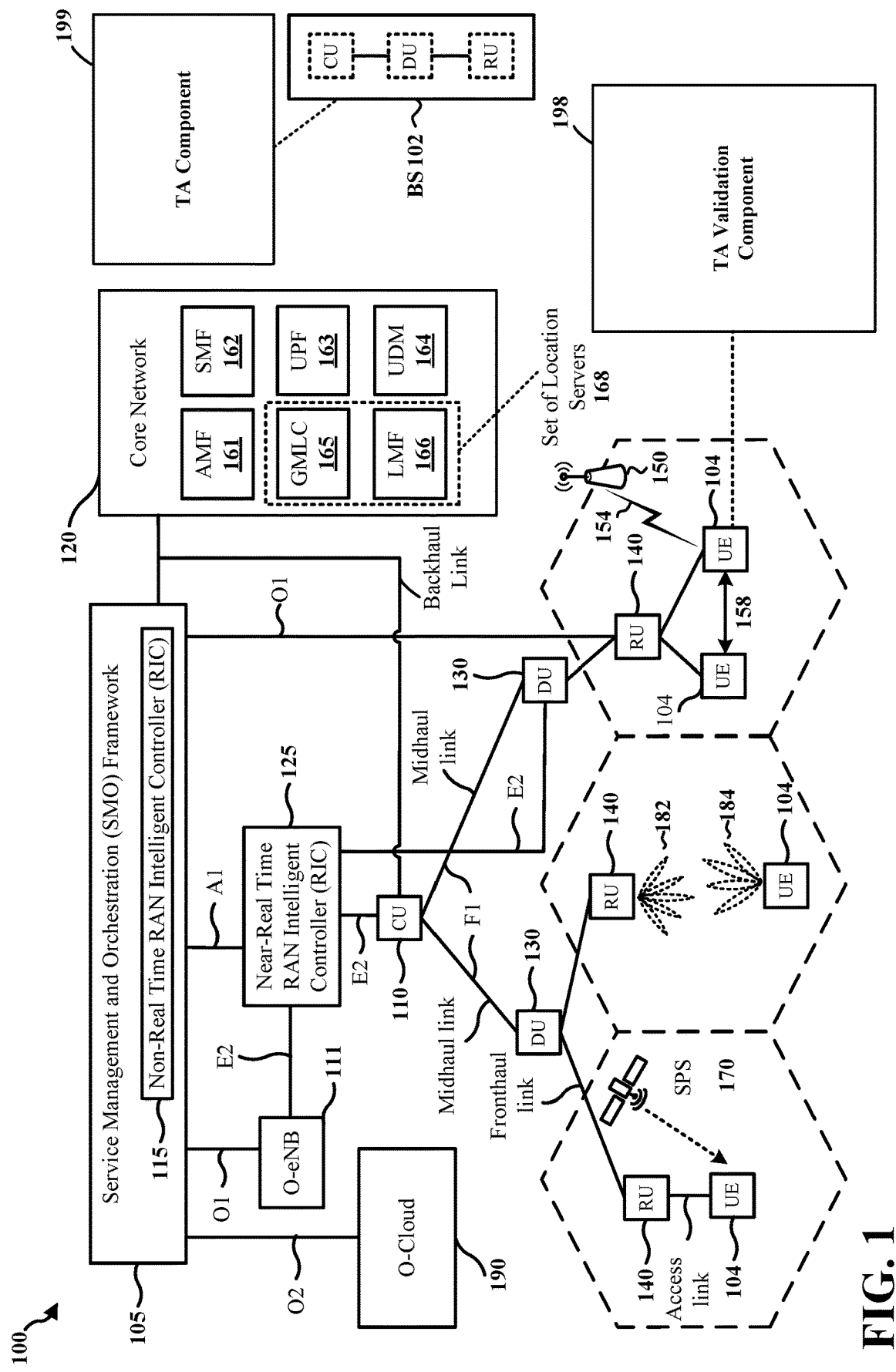
FIG. 1 is a diagram illustrating an example of a wireless communications system and an access network.

A UE may apply a TA for UL transmissions with a cell to account for propagation delays between the UE and the cell. When the UE receives signaling from a network to connect to a to-be-activated cell in a L1/L2 mobility configured cell set, the network may provide an estimated TA to the UE, where the estimated TA may be based on a measurement report transmitted by the UE to the network. However, the estimated TA may be inaccurate. Applying an inaccurate TA for UL transmissions may impact communications reliability. Various techniques for UE-side TA validation are described herein that may utilize reference signal received power (RSRP) measurements to represent channel strength. In an example, a UE transmits, at a first time instance, an indication of a first measurement on at least one DL-RS associated with a first cell, where the first cell is included in a L1 mobility configured cell set or a L2 mobility configured cell set. The UE receives, at a second time instance after the first time instance, an estimated TA associated with the first cell. The UE performs a second measurement on the at least one DL-RS. The UE accepts or rejects the estimated TA for communication with the first cell based on at least one of the first measurement or the second measurement. Via the aforementioned TA validation procedure, the UE may be able to reject inaccurate TAs. As such, the TA validation procedure may lead to increased communications reliability.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a TA validation component 198 that is configured to transmit, at a first time instance, an indication of a first measurement on at least one DL-RS associated with a first cell, where the first cell is included in a L1 mobility configured cell set or a L2 mobility configured cell set; receive, at a second time instance after the first time instance, an estimated TA associated with the first cell; perform a second measurement on the at least one DL-RS; and accept or reject the estimated TA for communication with the first cell based on at least one of the first measurement or the second measurement. In certain aspects, the base station 102 may include a TA component 199 that is configured to receive, at a first time instance, an indication of a first measurement on at least one DL-RS associated with a first cell, where the first cell is included in a L1 mobility configured cell set or a L2 mobility configured cell set; estimate a TA associated with the first cell based on the first measurement on the at least one DL-RS; and transmit, at a second time instance after the first time instance, the estimated TA associated with the first cell. Although the following description may be focused on 5G NR, the concepts described herein may be applicable to other similar areas, such as LTE, LTE-A, CDMA, GSM, and other wireless technologies.

Figure 2:
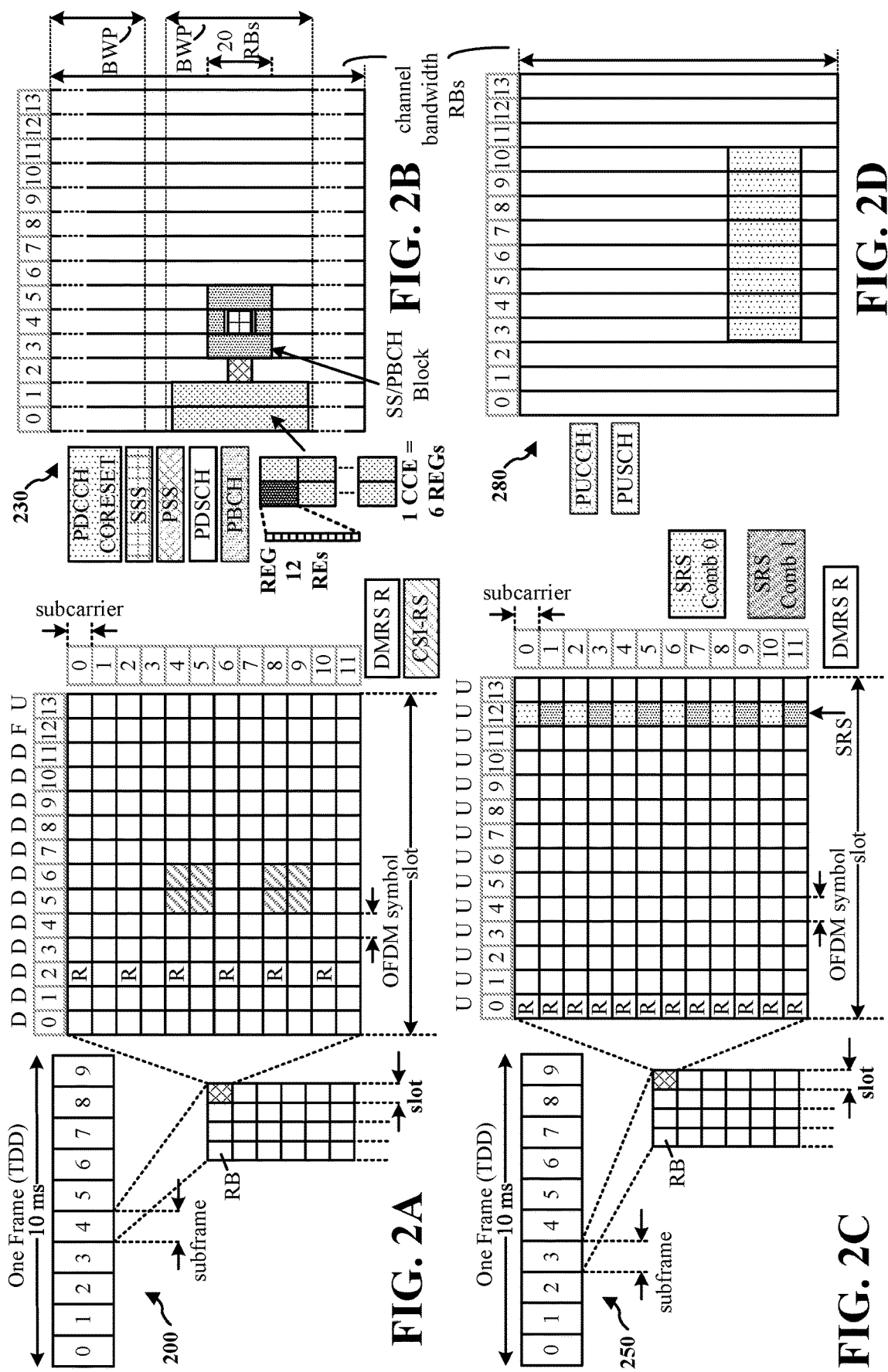
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| $\mu$ | SCS $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^{\mu*15}$ kHz, where $\mu$ is the numerology 0 to 4. As such, the numerology $\mu$=0 has a subcarrier spacing of 15 kHz and the numerology $\mu$=4 has a subcarrier spacing of 240 kHz. The symbol length/duration is inversely related to the subcarrier spacing. FIGS. 2A-2D provide an example of normal CP with 14 symbols per slot and numerology $\mu$=2 with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
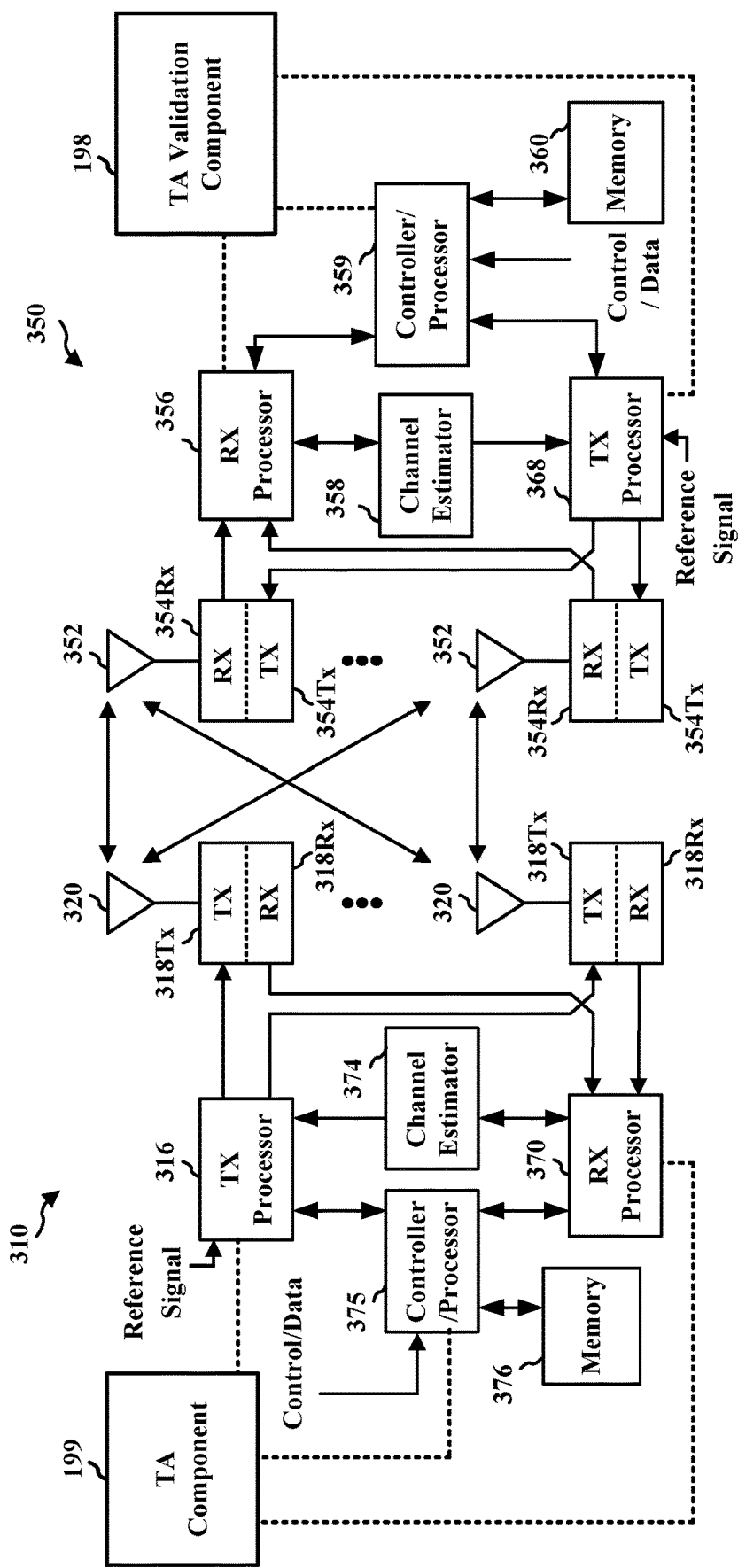
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the TA validation component 198 of FIG. 1.

At least one of the TX processor 316, the RX processor 370, and the controller/processor 375 may be configured to perform aspects in connection with the TA component 199 of FIG. 1.

Figure 4:
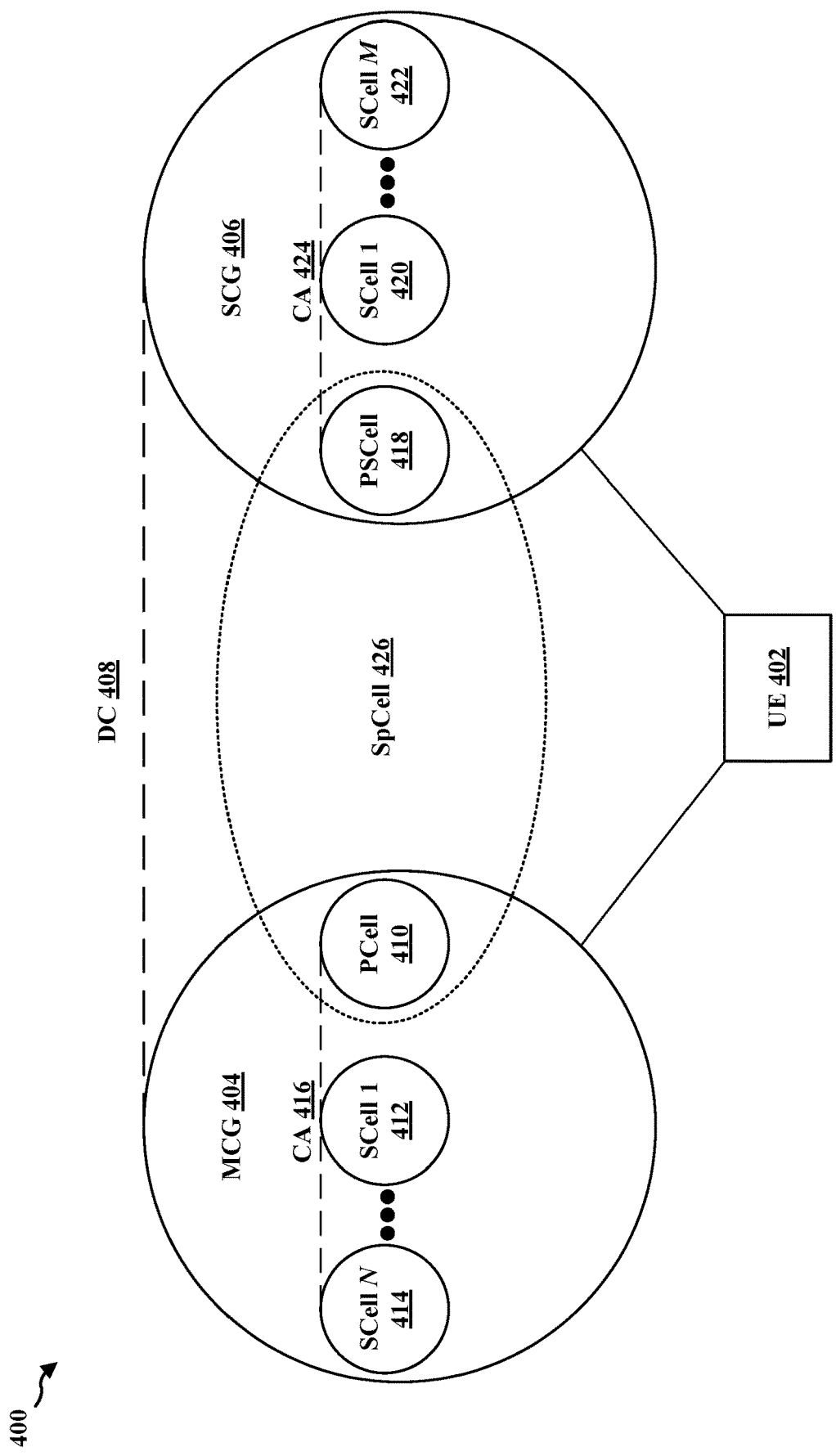
FIG. 4 is a diagram illustrating example cell designations.

FIG. 4 is a diagram 400 that illustrates an example of dual connectivity and carrier aggregation (CA). A UE 402 may be connected to a master cell group (MCG) 404 and a secondary cell group (SCG) 406. Such an arrangement may be referred to as dual connectivity (DC) 408. The MCG 404 may be a group of serving cells associated with a master node that has a control plane connection to a core network (e.g., the core network 120). The master node may be a base station such as a gNB, an eNB, etc. (i.e., a network entity). The SCG 406 may be a group of serving cells associated with a secondary node that does not have a control plane connection to the core network. The secondary node may be a base station, such as a gNB, an eNB, etc. (i.e., a network entity). The MCG 404 may become the SCG 406 and the SCG 406 may become the MCG 404 based upon various factors, such as a location of the UE 402, network conditions, etc.

The MCG 404 includes a PCell 410. The MCG 404 may also include one or more SCells (e.g., a first SCell 412 and an Nth SCell 414, where N is a positive integer greater than one). The PCell 410, the first SCell 412, and/or the Nth SCell 414 may be in a CA 416 configuration. In some aspects, a primary cell may become a secondary cell or that a secondary cell may become a primary cell based upon various factors, such as a location of the UE 402, network conditions, etc.

The SCG 406 includes a primary secondary cell (PSCell) 418. The PSCell 418 is a primary cell of the SCG 406. The SCG 406 may also include one or more SCells (e.g., a first SCell 420 and an Mth SCell 422, where M is a positive integer greater than one). The PSCell 418, the first SCell 420, and/or the Mth SCell 422 may be in a CA configuration 424. In some aspects, a primary secondary cell may become a secondary cell or that a secondary cell may become a primary secondary cell based upon various factors, such as a location of the UE 402, network conditions, etc.

The PCell 410 of the MCG 404 and the PSCell 418 of the SCG 406 may be referred to as a special cell (SpCell) 426. For a dual connectivity operation, the term SpCell refers to the PCell of the MCG or the PSCell of the SCG, e.g., depending on whether the MAC entity is associated to the MCG or the SCG, respectively. An SpCell supports PUCCH transmission and contention-based random access, and is always activated. The SpCell 426 is responsible for data and control functionality. In cases in which there is no DC (e.g., when the MCG 404 is configured and when the SCG 406 is not configured), the PCell 410 may be referred to as the SpCell 426. A cell group that includes the SpCell 426 may be referred to as a PCG. It is to be understood that an SpCell may change based upon various factors, such as a location of the UE 402, network conditions, etc. In an example, a network entity may configure the first SCell 412 as a primary cell and Mth SCell 422 as a primary secondary cell to configure a new SpCell.

Figure 5:
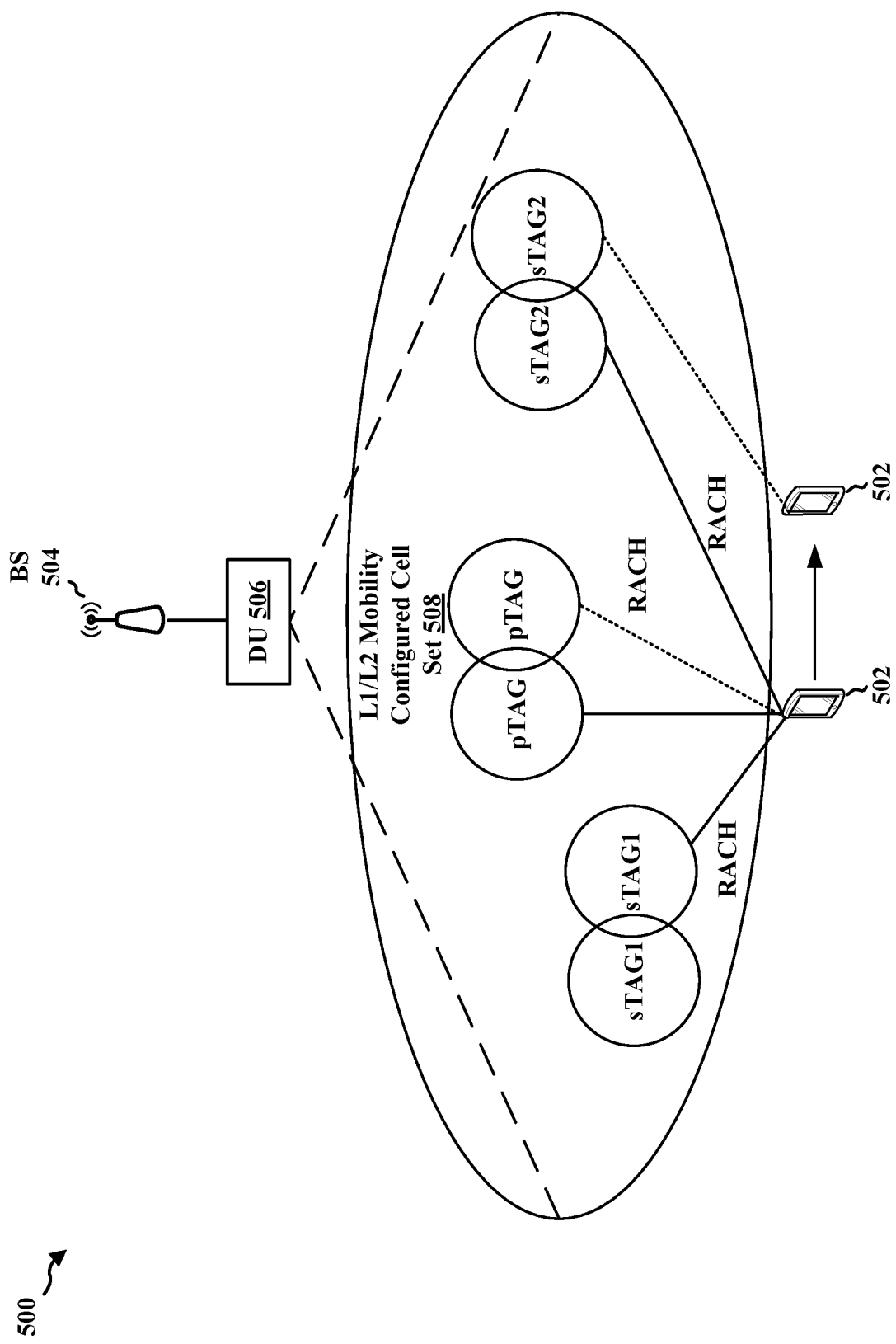
FIG. 5 is a diagram illustrating example timing adjustment groups (TAGs).

FIG. 5 is a diagram 500 illustrating example TAGs for cell synchronization. A base station 504 (e.g., via a DU 506) may configure a L1/L2 mobility configured cell set 508 for a UE 502. The term "L1/L2 mobility configured cell set" may refer to a set of cells configured for a UE such that cells in the set of cells may be updated to become an SpCell by a base station (e.g., a gNB) using L1 or L2 signaling. L1 signaling may refer to DCI. L2 signaling may refer to a medium access control (MAC) control element (MAC-CE). Cells (represented as circles in the diagram 500) within the L1/L2 mobility configured cell set 508 may belong to the same or different TAGs. Each TAG may be associated with a different TA. The term "TA" may refer to a command sent by a base station to a UE to adjust an uplink transmission of the UE such that the UE sends UL symbols in advance according to a command for a transmission, such as a PUSCH, PUCCH, and/or SRS transmission. The UE 502 may apply a TA associated with a TAG for uplink communications via/with/over a cell belonging to the TAG. A TA may refer to a negative offset at the UE 502 between a start of a DL slot as observed by the UE 502 and a start of an UL slot. The TA may account for propagation delays such that UL and DL transmission of the UE align at a reference point. In general, a first UE that is located relatively far from a base station may start an UL transmission relatively sooner than a second UE that is located relatively near the base station. As such, the first UE may apply a larger TA for UL transmissions than a TA applied by the second UE.

A TAG that includes a PCell (or an SpCell) may be referred to as a primary TAG (pTAG). A TAG that includes SCell(s) (and not a PCell or an SpCell) may be referred to as a secondary TAG (sTAG). The diagram 500 depicts cells belonging to a pTAG, cells belonging to a sTAG1, and cells belonging to a sTAG2. The base station 504 may associate SCells to a TAG when the SCells are added to the L1/L2 mobility configured cell set 508. Initial TAG assignment may be determined by the base station 504 (i.e., a serving gNB). The base station 504 may determine the initial TAG assignment based upon a band of operations, existence of repeaters, a location of a cell, and/or a location of the UE 502.

To establish initial timing, the UE 502 may perform a RACH procedure with the pTAG, that is, the UE 502 may perform the RACH procedure with the SpCell (or the PCell). The UE may obtain a TA associated with the pTAG upon completion of the RACH procedure. To further establish initial timing, the UE 502 may perform a RACH procedure with a SCell belonging to a sTAG. For instance, the UE 502 may receive a PDCCH order from a base station associated with the SCell. The UE 502 may perform a contention-free RACH procedure upon reception of the PDCCH order. The UE 502 may obtain a TA associated with the sTAG upon completion of the contention-free RACH procedure.

Cells (or cell groups) within the L1/L2 mobility configured cell set 508 may be activated or deactivated by the base station 504 via L1/L2 signaling. Cells/cell groups within the L1/L2 mobility configured cell set 508 that are activated may be used by the UE 502 for data transfer and control. In an example, when the UE 502 is at a first location, cells in the pTAG and the sTAG1 may be activated. As the UE 502 moves to a second location, the base station 504 may transmit L1/L2 signaling that activates/deactivates cells/cell groups. In an example, the L1/L2 signaling transmitted by the base station 504 when the UE 502 is at the second location may activate cells in the sTAG2.

For L1/L2 inter-cell mobility, the UE 502 may obtain a TA for a cell/cell group when the cell/cell group is activated. Obtaining TAs for activated cells in a relatively rapid manner may facilitate increased communications reliability at the UE 502. The UE 502 may receive frequent updates for TAs for activated cells/cell groups. However, TAs for deactivated cells/cell groups may not be as up-to-date as compared to TAs for activated cells/cell groups. In an example, the UE 502 may transmit a report (e.g., a L1 report) to the base station 504 that includes a DL timing difference between a reference cell and a deactivated cell. The base station 504 may calculate an estimated TA for the deactivated cell based upon the DL timing difference. The estimated TA for the deactivated cell may be inaccurate due to a lack of active communication between the UE 502 and the deactivated cell. The estimated TA for the deactivated cell may also be inaccurate due to a TA estimate error based on the DL timing difference included in the report. The UE 502 may obtain an accurate TA for a deactivated cell by performing a RACH procedure ordered by a PDCCH order; however, the RACH procedure may be time consuming.

Figure 6:
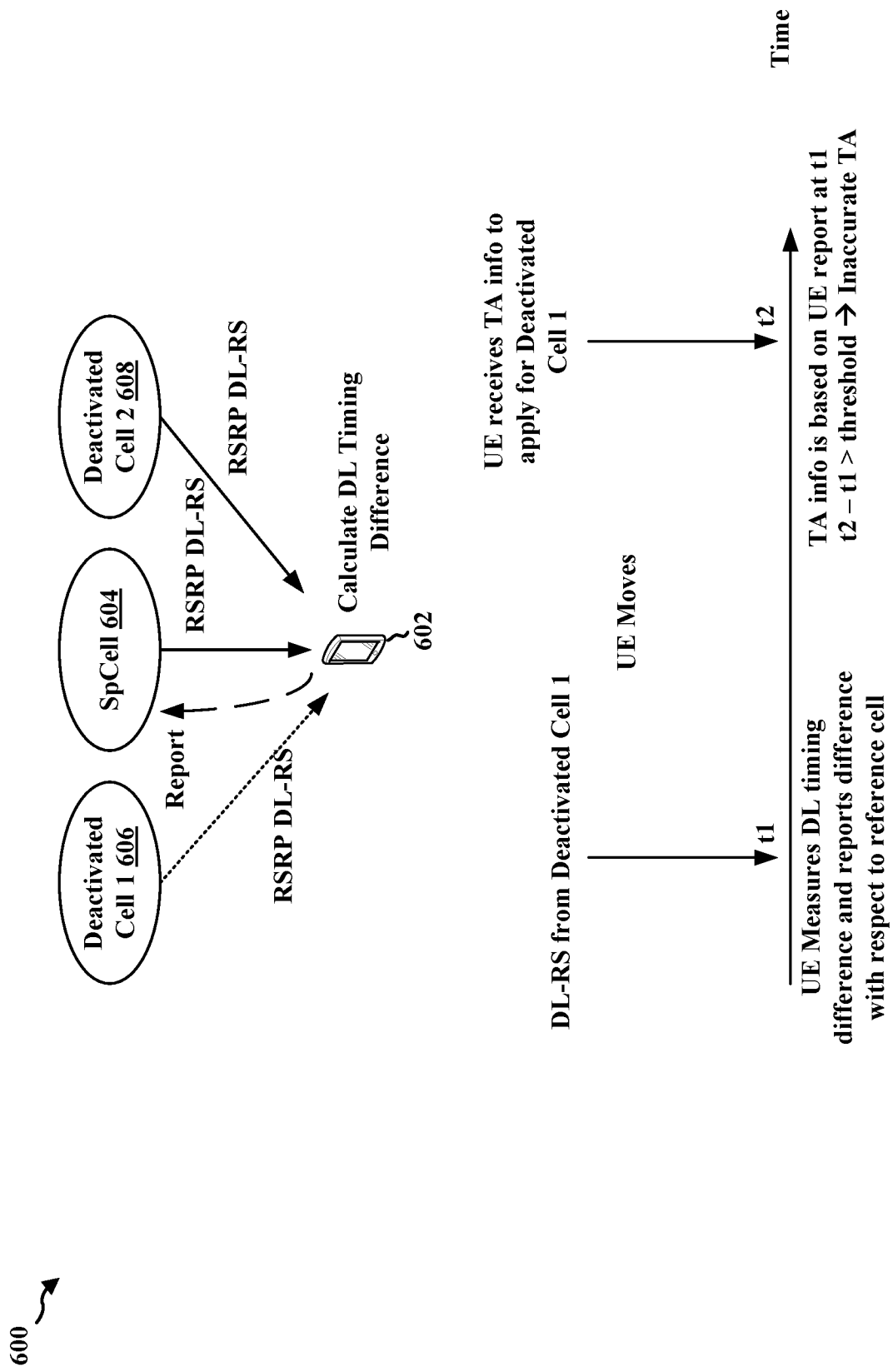
FIG. 6 is a diagram illustrating an example of a UE calculating a DL timing difference and receiving a TA.

FIG. 6 is a diagram 600 illustrating an example of a UE 602 calculating a DL timing difference and receiving a TA. The UE 602 may perform validation on a TA obtained from a base station (e.g., a gNB) before applying the TA. The validation may be based on a quality of service (QoS) of serving traffic. The validation may also be based on a maximum transmission timing deviation allowance of the UE 602 (which may be referred to as "Te"). In an example, the maximum transmission timing deviation allowance may be 3 μs.

The UE 602 may perform reference signal received power (RSRP) measurements on downlink reference signals (DL-RSs) transmitted by a first deactivated cell 606, an SpCell 604 for the UE 602, and a second deactivated cell 608. The UE 602 may also calculate DL timing differences (with respect to a reference cell) for the first deactivated cell 606, the SpCell 604, and the second deactivated cell 608 based on the DL-RSs.

In an example, the UE 602 may receive a DL-RS from the first deactivated cell 606 and at time t1, the UE 602 may measure a DL timing difference with respect to a reference cell and report the DL timing difference to the SpCell 604. At time t2 that occurs after time t1, the UE 602 may receive an estimated TA (referred to as "TA info" in the diagram 600) from the SpCell 604, where the estimated TA is for communications via/with/over the first deactivated cell 606. In an example, the first deactivated cell 606 may be a cell that is to be activated. However, the UE 602 may have changed locations between time t1 and time t2. The estimated TA may be based on the DL timing difference reported at time t1. If a difference between time t2 and time t1 is greater than a threshold, the estimated TA may be inaccurate for communications via/with/over the first deactivated cell 606. Stated differently, a strength of a channel associated with the first deactivated cell 606 may have changed by more than a threshold amount between time t1 and time t2. Furthermore, the UE 602 may not report (i.e., RSRP report) at a frequency that enables the SpCell 604 to accurately estimate the TA. Additionally, if the UE 602 does not apply the estimated TA within a threshold period of time after receiving the estimated TA, the estimated TA may be inaccurate due to mobility of the UE 602.

In a wireless communication system, a network may aim to ensure that a UE maintains connectivity with a network entity (e.g., a base station) as the UE moves within a network. L1/L2 based inter-cell mobility may help to reduce mobility latency. For instance, configuration and maintenance of multiple candidate cells may allow for rapid application of configurations for candidate cells. Furthermore, dynamic switching mechanisms among candidate serving cells (including an SpCell and SCell) based on L1/L2 signaling may further reduce latency.

L1/L2 based inter-cell mobility may be applicable to standalone operation scenarios, CA scenarios, and DC (e.g., NR-DC) scenarios. In the standalone operation scenarios and CA scenarios, L1/L2 based inter-cell mobility may be applicable for intra-DU cases and/or intra CU inter-DU cases. L1/L2 based inter-cell mobility is applicable in both FR1 and FR2, as well as both in intra-frequency and inter-frequency. In L1/L2 based inter-cell mobility, source cells and target cells may be synchronized or non-synchronized.

A UE may apply a TA for UL transmissions with a cell to account for propagation delays between the UE and the cell. When the UE receives signaling from a network to connect to a to-be-activated cell in a L1/L2 mobility configured cell set, the network may provide an estimated TA to the UE, where the estimated TA may be based on a measurement report transmitted by the UE to the network. However, the estimated TA may be inaccurate for various reasons. In one example, channel strength may have changed between a time at which the UE last transmitted a measurement report and a time at which the estimated TA is obtained, which may lead to the estimated TA being inaccurate. In another example, the UE may not transmit measurement reports frequently enough to enable the network to accurately generate the estimated TA. In yet another example, the estimated TA may be inaccurate due to UE mobility, that is, a time at which the UE applies the estimated TA may be too far away from a time at which the network generates the estimated TA. Applying an inaccurate TA for UL transmissions may impact communications reliability.

Various techniques for UE-side TA validation are described herein that may utilize RSRP measurements to represent channel strength. In an example, a UE transmits, at a first time instance, an indication of a first measurement on at least one DL-RS associated with a first cell, where the first cell is included in a L1 mobility configured cell set or a L2 mobility configured cell set. The UE receives, at a second time instance after the first time instance, an estimated TA associated with the first cell. The UE performs a second measurement on the at least one DL-RS. The UE accepts or rejects the estimated TA for communication with the first cell based on at least one of the first measurement or the second measurement. Via the aforementioned TA validation procedure, the UE may be able to reject inaccurate TAs. As such, the TA validation procedure may lead to increased communications reliability.

Figure 7:
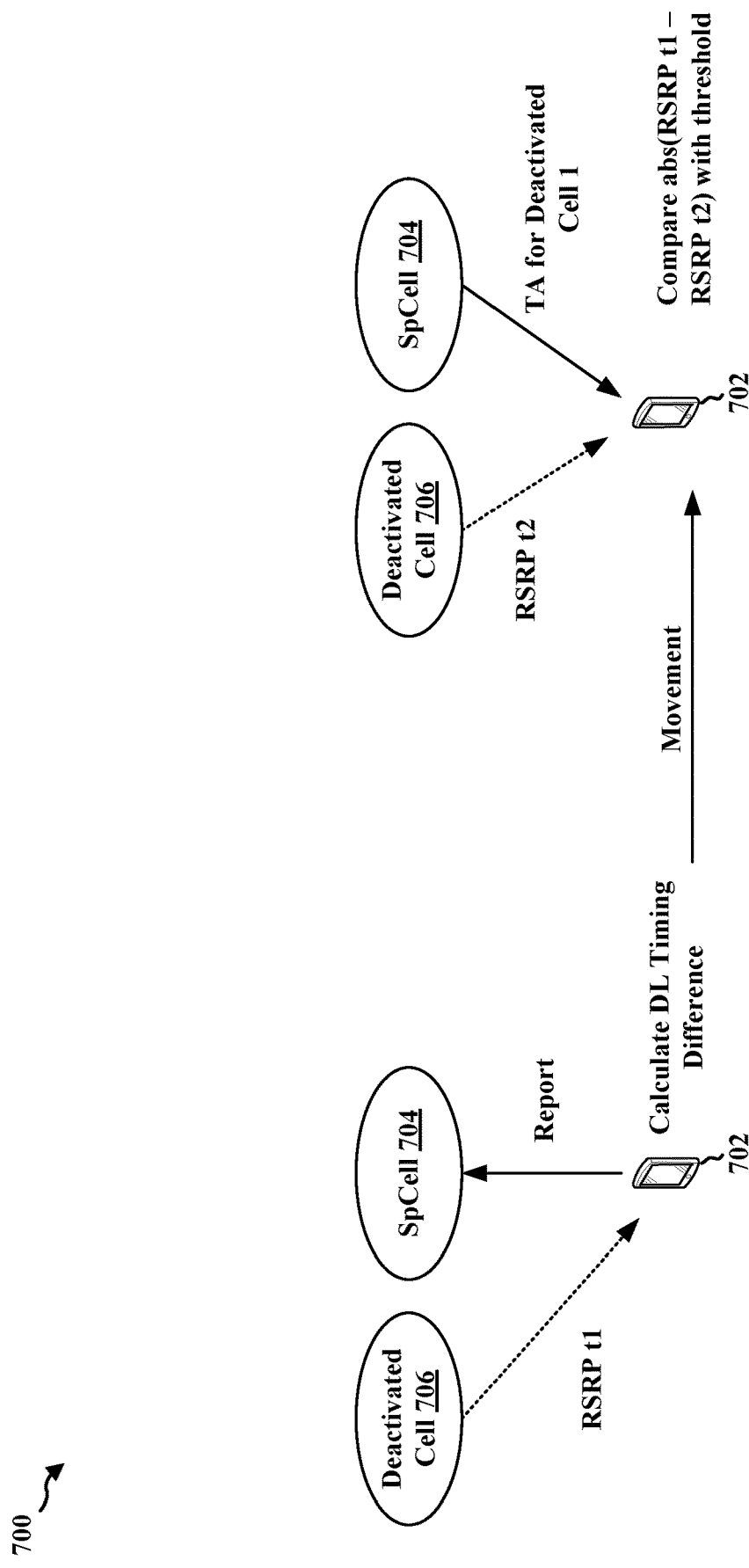
FIG. 7 is a diagram illustrating an example of UE-side TA validation.

FIG. 7 is a diagram 700 illustrating an example of UE-side TA validation. The UE-side TA validation may be based on RSRP measurements performed on DL-RSs. A UE 702 may utilize a filtered (e.g., averaged) RSRP measurement to represent channel strength. The channel strength may be associated with a location of the UE 702. For instance, as the location of the UE 702 changes, a TA of the UE 702 for communication via/with/over a cell may change. Furthermore, as the location of the UE 702 changes, a RSRP measurement performed on a DL-RS associated with the cell may also change. In general, the UE 702 may utilize a change in RSRP measurement to determine a TA change.

The UE 702 may be configured via RRC signaling with a RSRP change threshold. Each cell in a L1/L2 mobility configured cell set (e.g., the L1/L2 mobility configured cell set 508) may be configured with a unique threshold (or the same threshold). At time t1, the UE 702 may transmit a L1 report to an SpCell 704. The L1 report may include a downlink timing difference calculated by the UE 702 with respect to a reference cell. The UE 702 may calculate the DL timing difference based on a DL-RS transmitted by a deactivated cell 706 in the L1/L2 mobility configured cell set (e.g., the L1/L2 mobility configured cell set 508). The L1 report may also include a first RSRP measurement performed by the UE 702 on the DL-RS of the deactivated cell 706.

At time t2 that occurs after time t1, the UE 702 may receive an estimated TA from the SpCell 704, where the estimated TA may be based on the DL timing difference. In an example, the UE 702 has changed locations between time t1 and time t2. As a result, the deactivated cell 706 may be activated at a time occurring after time t2. The estimated TA may be for communication of the UE 702 via/with/over the deactivated cell 706 (which is to be activated). The SpCell 704 may estimate the estimated TA based on the DL timing difference. Upon receiving the estimated TA, the UE 702 may perform a second RSRP measurement on the DL-RS transmitted by the deactivated cell 706. The UE 702 may determine an RSRP change between time t1 and time t2. For instance, the UE 702 may compare an absolute value of a difference between the first RSRP measurement at time t1 and the second RSRP measurement at time t2 with a threshold. The threshold may be unique to the deactivated cell 706 or shared by several cells. If the RSRP change is less than the threshold, the UE 702 may accept the estimated TA for communications via/with/over the (to-be-activated) deactivated cell 706. If the RSRP change is greater than or equal to the threshold, the UE 702 may reject the estimated TA.

Figure 8:
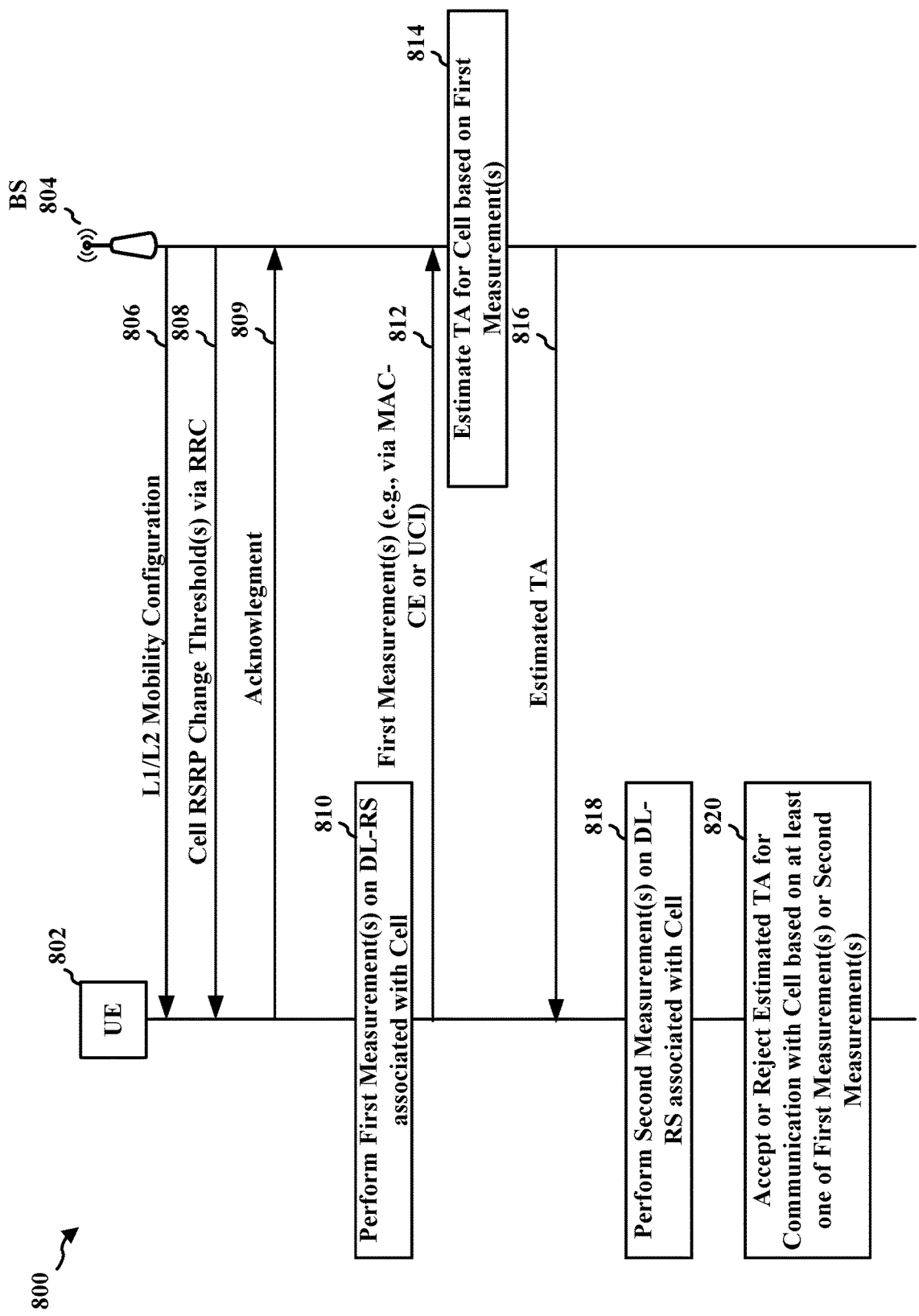
FIG. 8 is a diagram illustrating example communications between a UE and a base station.

FIG. 8 is a diagram 800 illustrating example communications between a UE 802 and a base station 804. The communications may be for validating a TA. The base station 804 may be associated with a current SpCell of the UE 802. At 806, the UE 802 may receive a L1/L2 mobility configuration transmitted by the base station 804. In an example, the L1/L2 mobility configuration may configure the L1/L2 mobility configured cell set 508. At 808, the UE 802 may receive, via RRC signaling, RSRP change thresholds for cells. The RRC signaling may configure each cell in the cells with an individual change threshold. At 809, the UE 802 may transmit an acknowledgment to the base station 804, where the acknowledgment may indicate that RRC configuration/reconfiguration is complete.

At 810, the UE 802 may perform, at a first point in time, first measurement(s) on a DL-RS associated with a cell. In an example, the cell may be a currently deactivated cell in the L1/L2 mobility configured cell set 508. The first measurement(s) may include a DL timing difference of the cell with respect to a reference cell. The first measurement(s) may also include an RSRP measurement performed on the DL-RS. The RSRP measurement may be an average RSRP measurement.

At 812, the UE 802 may transmit the first measurement(s) to the base station 804. At 814, the base station 804 may estimate a TA for the cell based on the DL timing difference transmitted at 812. At 816, the UE 802 may receive the estimated TA from the base station 804. At 818, the UE 802 may perform, at a second point in time occurring after the first point in time, second measurement(s) on the DL-RS associated with the cell. The second measurement(s) may include an RSRP measurement. The RSRP measurement may be an average RSRP measurement. At 820, the UE 802 may accept or reject the estimated TA for communication via/with/over the cell based on at least one of the first measurement(s) or the second measurement(s). In an example, the UE 802 may compute a difference between a first RSRP measurement performed by the UE 802 at 810 and a second RSRP measurement performed by the UE 802 at 818. If the difference is greater than a threshold value, the UE 802 may reject the estimated TA. If the difference is less than the threshold value, the UE 802 may accept the estimated TA. In one aspect, the UE may compute an absolute value of the difference prior to comparing the difference to the threshold value. As noted above, the threshold value may be specific to the cell and may be configured via RRC signaling. If the UE 802 accepts the estimated TA, the UE 802 may communicate via/with/over the cell using the estimated TA.

Figure 9:
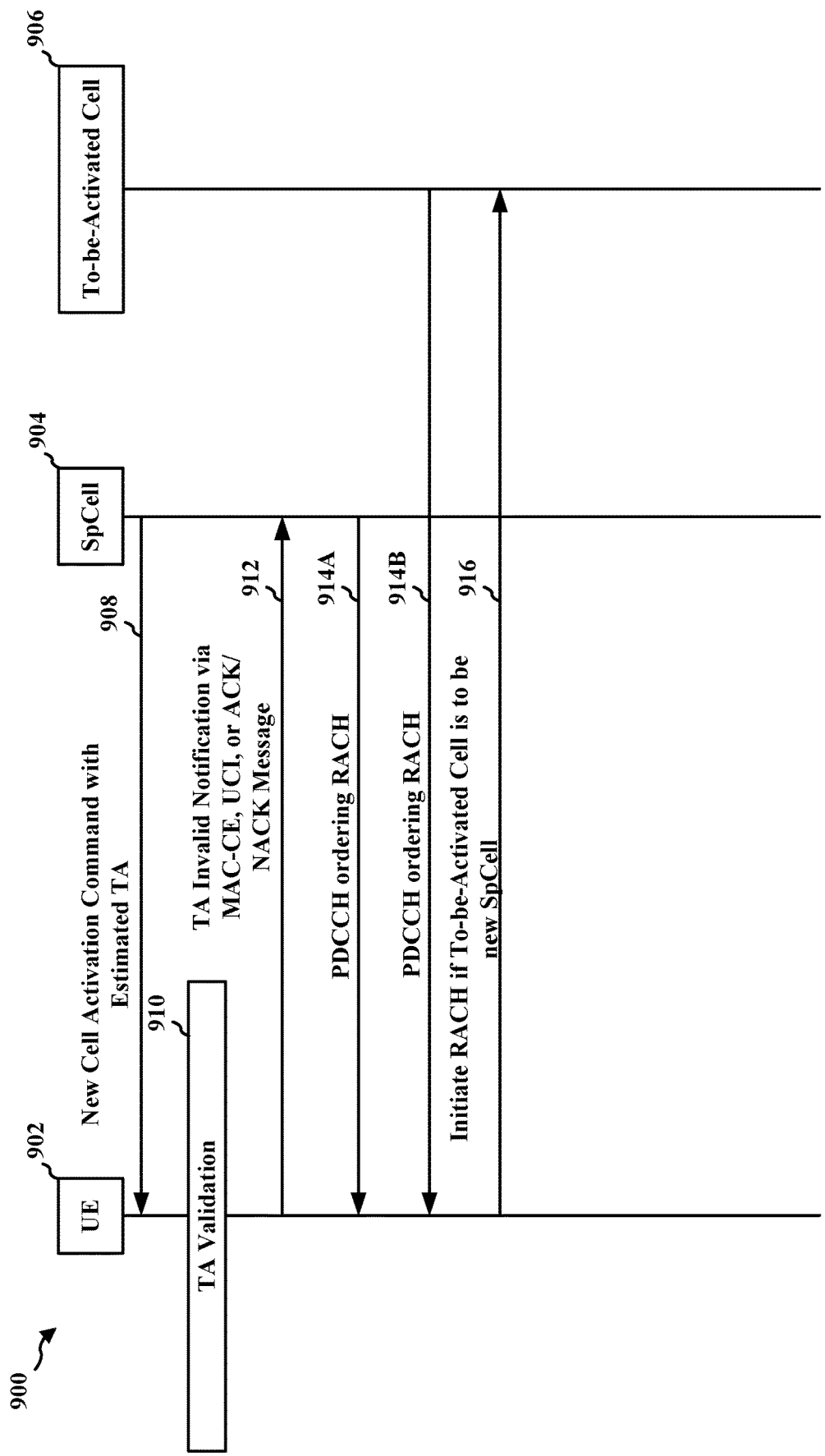
FIG. 9 is a diagram illustrating example communications between a UE, a special cell (SpCell), and a to-be-activated cell.

FIG. 9 is a diagram 900 illustrating example communications between a UE 902, a SpCell 904, and a to-be-activated cell 906. The to-be-activated cell 906 may serve as an SpCell when activated or as an SCell when activated. At 908, the UE 902 may receive a new cell activation command for the to-be-activated cell 906 from the SpCell 904. In an example, the SpCell 904 may be associated with the base station 804 described above in the description of the diagram 800. The new cell activation command may include an estimated TA for the to-be-activated cell 906. In an example, 908 may correspond to 816 described above in the description of the diagram 800. The new cell activation command may indicate that the UE 902 is to acknowledge the new cell activation command. At 910, the UE 902 may perform TA validation based upon the estimated TA included in the new cell activation command. In an example, 910 may correspond to 820 (and also 810 and 818) described above in the description of the diagram 800.

In an example, the UE 902 may determine that the estimated TA is invalid (e.g., based on an RSRP change measurement) for communication via/with/over the to-be-activated cell 906. At 912, the UE 902 may transmit a TA invalid notification to the SpCell 904. The TA invalid notification may indicate that the estimated TA has been rejected for communication with the to-be-activated cell 906. In one aspect, the TA invalid notification is transmitted via a medium access control (MAC) control element (MAC-CE), such as a dedicated MAC-CE. In another aspect, the TA invalid notification is transmitted via an uplink control information (UCI), such as a dedicated UCI. In yet another aspect, the UE 902 may bind the TA-invalid notification with an acknowledgement/non-acknowledgment (ACK/NACK)

message for the new cell activation command received at 908. For instance, the UE 902 may delay acknowledging the new cell activation command until after TA validation is performed at 910.

In one aspect, at 914A, the UE 902 may receive a PDCCH order from the SpCell 904 that orders the UE 902 to initiate a RACH procedure with the to-be-activated cell 906. The SpCell 904 may transmit the PDCCH order based upon receiving the TA invalid notification transmitted by the UE 902 at 912. In another aspect, at 914B, the UE 902 may receive a PDCCH order from the to-be-activated cell 906 that orders the UE 902 to initiate a RACH procedure with the to-be-activated cell 906. In an example, a base station associated with the SpCell 904 (e.g., the base station 804) may communicate with a base station associated with the to-be-activated cell 906 in order to cause the to-be-activated cell 906 to transmit the PDCCH order received by the UE 902 at 914B. At 916, the UE 902 may initiate a RACH procedure with the to-be-activated cell 906 if the to-be-activated cell 906 is to serve as the new SpCell. The UE 902 may obtain a correct TA for the to-be-activated cell 906 via the RACH procedure. When the to-be-activated cell 906 is activated, the UE 902 may communicate via/with/over the (now-activated) to-be-activated cell 906 via the correct TA.

Figure 10:
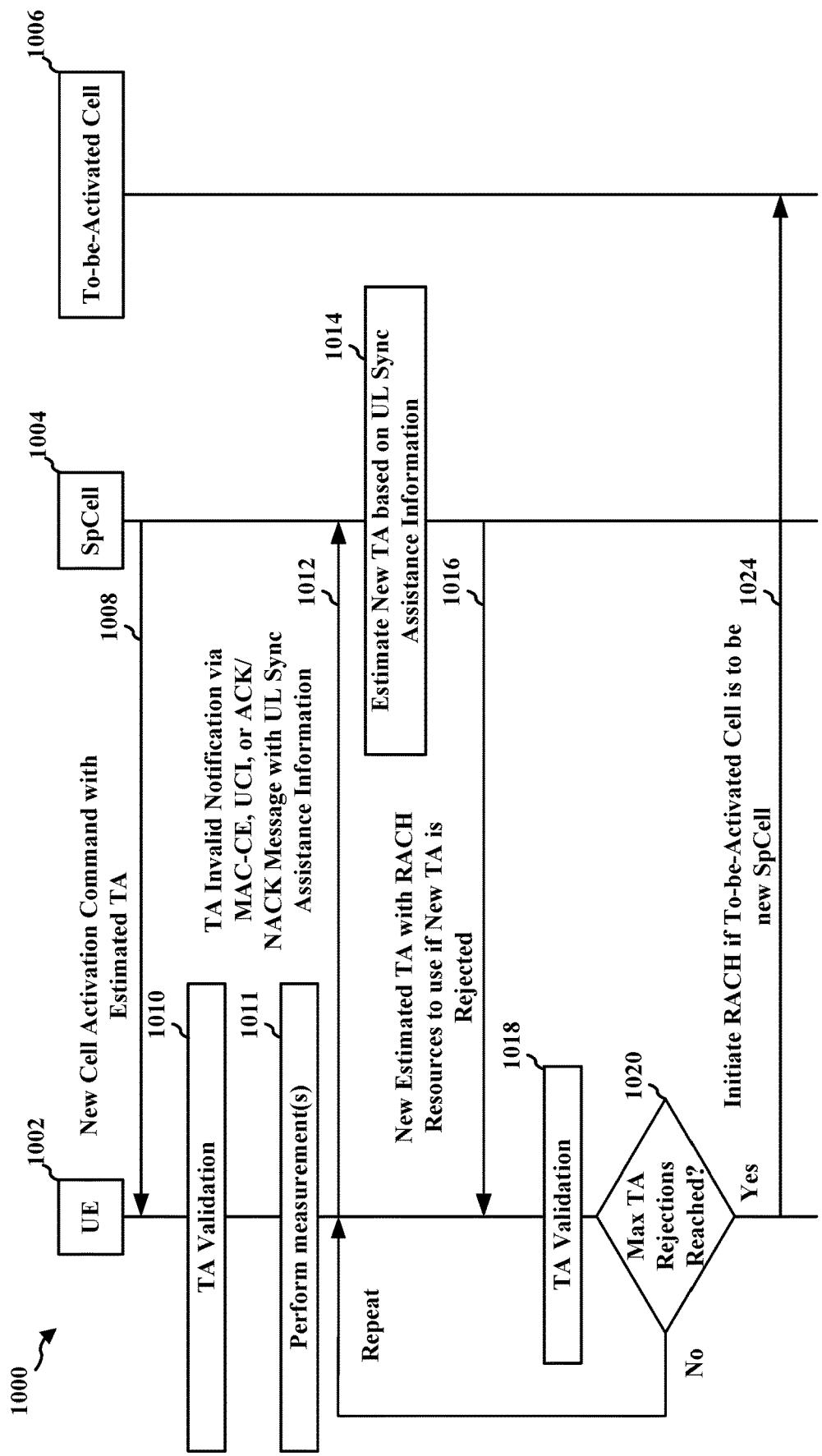
FIG. 10 is a diagram illustrating example communications between a UE, a SpCell, and a to-be-activated cell.

FIG. 10 is a diagram 1000 illustrating example communications between a UE 1002, a SpCell 1004, and a to-be-activated cell 1006. The to-be-activated cell 1006 may serve an SpCell when activated or as an SCell when activated. At 1008, the UE 1002 may receive a new cell activation command for the to-be-activated cell 1006 from the SpCell 1004. In an example, the SpCell 1004 may be associated with the base station 804 described above in the description of the diagram 800. The new cell activation command may include an estimated TA for the to-be-activated cell 1006. In an example, 1008 may correspond to 816 described above in the description of the diagram 800. The new cell activation command may indicate that the UE 1002 is to acknowledge the new cell activation command. At 1010, the UE 902 may perform TA validation based upon the estimated TA included in the new cell activation command. In an example, 1010 may correspond to 820 (and also 810 and 818) described above in the description of the diagram 800. For instance, the UE 1002 may perform first measurement(s) on a DL-RS associated with the to-be-activated cell 1006, where the first measurement(s) may include a DL timing difference of the to-be-activated cell 1006 with respect to a reference cell and/or a RSRP measurement. The UE 1002 may transmit the first measurement(s) to the SpCell 1004 and receive an estimated TA from the SpCell 1004 based upon the DL timing difference.

In an example, the UE 1002 may determine that the estimated TA is invalid (e.g., based on an RSRP change measurement) for communication via/with/over the to-be-activated cell 1006. At 1011, the UE 1002 may perform another measurement on the DL-RS associated with the SpCell 1004. Such a measurement may include a DL timing difference with respect to a reference cell and/or a RSRP measurement. At 1012, the UE 902 may transmit a TA invalid notification. The TA invalid notification may indicate that the estimated TA has been rejected for communication with the to-be-activated cell 1006. The TA invalid notification may also include UL synchronization assistance information (referred to herein as "UL sync assistance information"). The UL sync assistance information may include a latest DL timing difference (i.e., the DL timing difference measured at 1011) for the to-be-activated cell 1006 with respect to a reference cell. In one aspect, the TA invalid notification is transmitted via MAC-CE, such as dedicated MAC-CE. In another aspect, the TA invalid notification is transmitted via a UCI, such as a dedicated UCI. In yet another aspect, the UE 1002 may bind the TA-invalid notification with ACK/NACK message for the new cell activation command received at 1008. For instance, the UE 1002 may delay acknowledging the new cell activation command until after TA validation is performed at 1010.

At 1014, the SpCell 1004 may estimate a new TA for communication via/with/over the to-be-activated cell 1006 based on the UL sync assistance information. At 1016, the UE 1002 may receive the new estimated TA from the SpCell 1004. In one aspect, the UE 1002 may receive the new estimated TA via a MAC-CE. In another aspect, the UE 1002 may receive the new estimated TA via a DCI. The UE 1002 may also receive an indication of RACH resources for use in a RACH procedure if the UE 1002 rejects the new estimated TA.

At 1018, the UE 1002 may perform TA validation based upon the new estimated TA. In an example, 1018 may correspond to 1010 (and 818/820), with the new estimated TA being utilized in place of the (previous) estimated TA. For instance, the UE 1002 may perform a RSRP measurement on the DL-RS associated with the SpCell 1004 when the UE 1002 receives the new estimated TA. The UE 1002 may accept or reject the estimated TA based upon the RSRP measurement, the RSRP measurement performed at 1011, and a threshold similar to the UE 802 at 820. In an example, the UE 1002 may determine that the new estimated TA is invalid (e.g., based on an RSRP change measurement) for communication via/with/over the to-be-activated cell 1006. At 1020, the UE 1002 may determine whether a maximum number of TA rejections has occurred. In an example, the UE 1002 may receive an indication of the maximum number of TA rejections during the RRC configuration occurring at 808 in the diagram 800. If the maximum number of TA rejections has not occurred, the UE 1002 may repeat 1012 with updated UL sync assistance information. If the maximum number of TA rejection has occurred, at 1024, the UE 1002 may initiate a RACH procedure with the to-be-activated cell 1006 if the to-be-activated cell 1006 is to serve as a new SpCell. The UE 1002 may utilize the RACH resources received at 1016 for the RACH procedure. The UE 1002 may obtain a correct TA for the to-be-activated cell 1006 via the RACH procedure. When the to-be-activated cell 1006 is activated, the UE 902 may communicate via/with/over the (now-activated) to-be-activated cell 1006 via the correct TA.

Figure 11:
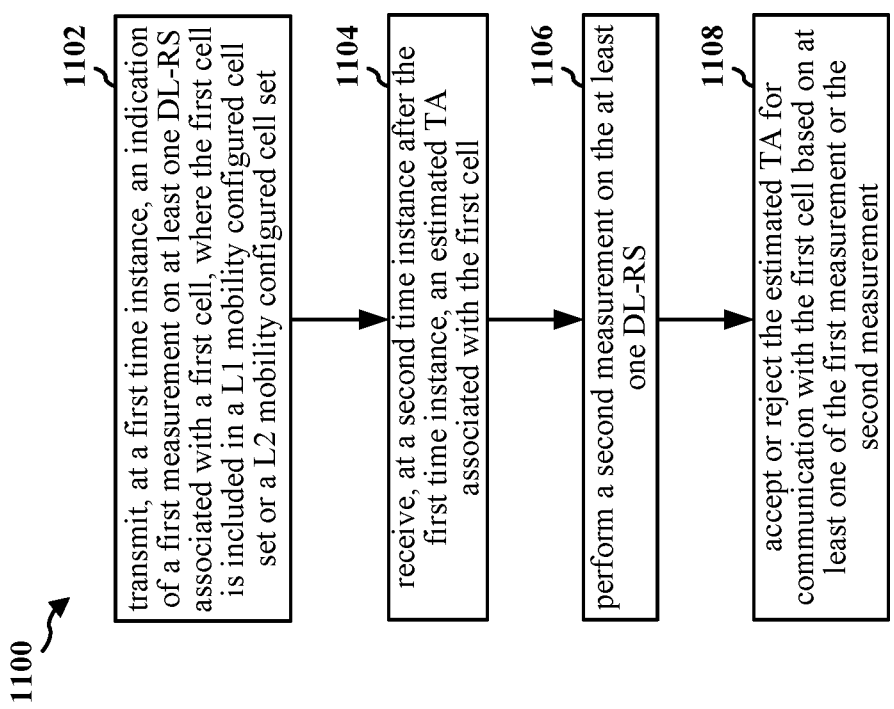
FIG. 11 is a flowchart of a method of wireless communication.

FIG. 11 is a flowchart 1100 of a method of wireless communication. The method may be performed by a UE (e.g., the UE 104, the UE 350, the UE 702, the UE 802, the UE 902, the UE 1002, the apparatus 1504, etc.). The method may be performed by the TA validation component 198. The method may be associated with various technical advantages at the UE, such as improved communications reliability via an accurate TA.

At 1102, the UE transmits, at a first time instance, an indication of a first measurement on at least one DL-RS associated with a first cell, where the first cell is included in a L1 mobility configured cell set or a L2 mobility configured cell set. For example, FIG. 8 at 812 shows the UE 802 transmitting first measurement(s). In an example, the first measurement(s) may be performed on a DL-RS associated with the deactivated cell 706 in FIG. 7. In another example, the first measurement(s) may include a DL timing difference with respect to a reference cell at time t1 as illustrated in FIG. 6. In a further example, the first measurement may also include a RSRP measurement performed at time t1 as illustrated in FIG. 7. In yet another example, the first cell may be included in the L1/L2 mobility configured cell set 508 illustrated in FIG. 5. For example, 1102 may be performed by the TA validation component 198.

At 1104, the UE receives, at a second time instance after the first time instance, an estimated TA associated with the first cell. For example, FIG. 8 at 816 shows the UE 802 receiving an estimated TA. In an example, the first cell may be the deactivated cell 706 in FIG. 7. For example, 1104 may be performed by the TA validation component 198.

At 1106, the UE performs a second measurement on the at least one DL-RS. For example, FIG. 8 at 818 shows the UE 802 performing second measurement(s) on a DL-RS. In another example, the second measurement may include a RSRP measurement performed at time t2 as illustrated in FIG. 7. For example, 1106 may be performed by the TA validation component 198.

At 1108, the UE accepts or rejects the estimated TA for communication with the first cell based on at least one of the first measurement or the second measurement. For example, FIG. 8 at 820 shows the UE 802 accepting or rejecting an estimated TA for communication with a cell based on at least one of first measurement(s) or second measurement(s). For example, 1108 may be performed by the TA validation component 198.

Figure 12:
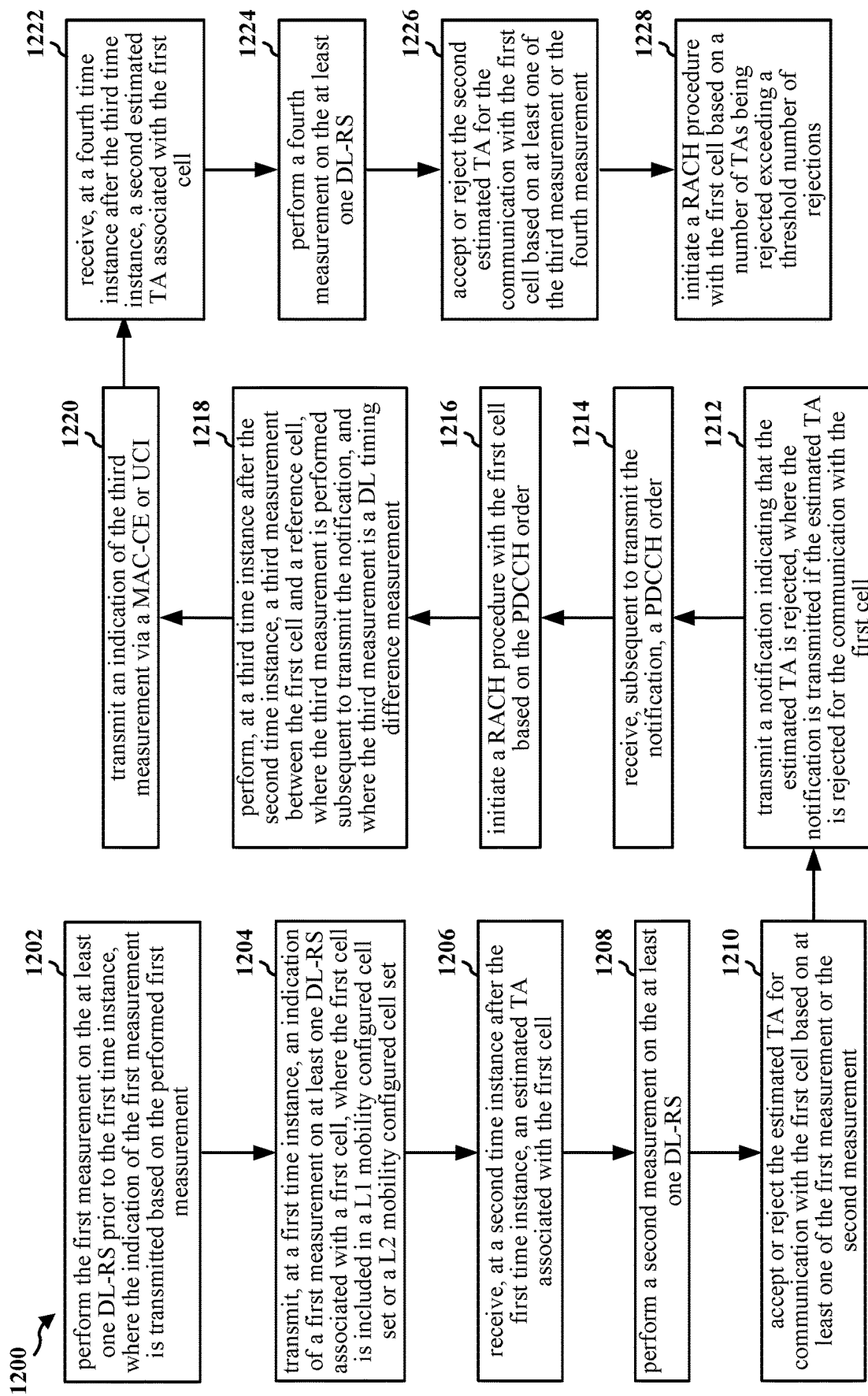
FIG. 12 is a flowchart of a method of wireless communication.

FIG. 12 is a flowchart 1200 of a method of wireless communication. The method may be performed by a UE (e.g., the UE 104, the UE 350, the UE 702, the UE 802, the UE 902, the UE 1002, the apparatus 1504, etc.). The method (including the various aspects described below) may be performed by the TA validation component 198. The method may be associated with various technical advantages at the UE, such as improved communications reliability via an accurate TA.

At 1204, the UE transmits, at a first time instance, an indication of a first measurement on at least one DL-RS associated with a first cell, where the first cell is included in a L1 mobility configured cell set or a L2 mobility configured cell set. For example, FIG. 8 at 812 shows the UE 802 transmitting first measurement(s). In an example, the first measurement(s) may be performed on a DL-RS associated with the deactivated cell 706 in FIG. 7. In another example, the first measurement(s) may include a DL timing difference with respect to a reference cell at time t1 as illustrated in FIG. 6. In a further example, the first measurement may also include a RSRP measurement performed at time t1 as illustrated in FIG. 7. In yet another example, the first cell may be included in the L1/L2 mobility configured cell set 508 illustrated in FIG. 5. For example, 1204 may be performed by the TA validation component 198.

At 1206, the UE receives, at a second time instance after the first time instance, an estimated TA associated with the first cell. For example, FIG. 8 at 816 shows the UE 802 receiving an estimated TA. In an example, the first cell may be the deactivated cell 706 in FIG. 7. For example, 1206 may be performed by the TA validation component 198.

At 1208, the UE performs a second measurement on the at least one DL-RS. For example, FIG. 8 at 818 shows the UE 802 performing second measurement(s) on a DL-RS. In another example, the second measurement may include a RSRP measurement performed at time t2 as illustrated in FIG. 7. For example, 1208 may be performed by the TA validation component 198.

At 1210, the UE accepts or rejects the estimated TA for communication with the first cell based on at least one of the first measurement or the second measurement. For example, FIG. 8 at 820 shows the UE 802 accepting or rejecting an estimated TA for communication with a cell based on at least one of first measurement(s) or second measurement(s). For example, 1210 may be performed by the TA validation component 198.

In one aspect, the estimated TA may be accepted or rejected further based on at least one of: a difference between the first measurement and the second measurement, or a RSRP threshold for the first cell associated with the second measurement. For example, FIG. 7 shows a threshold and a difference between a RSRP measurement performed at time t1 and a RSRP measurement performed at time t2.

In one aspect, at 1202, the UE may perform the first measurement on the at least one DL-RS prior to the first time instance, where the indication of the first measurement may be transmitted based on the performed first measurement. For example, FIG. 8 at 810 shows the UE 802 performing first measurement(s) on a DL-RS associated with a cell. For example, 1202 may be performed by the TA validation component 198.

In one aspect, the first cell may be a deactivated cell in the L1 mobility configured cell set or the L2 mobility configured cell set, where a second cell may serve as a SpCell prior to accepting or rejecting the estimated TA. For example, referring to FIG. 7, the first cell may be the deactivated cell 706 and the second cell may be the SpCell 704. In another example, the first cell and the second cell may be in the L1/L2 mobility configured cell set 508 illustrated in FIG. 5.

In one aspect, the first measurement may be a DL timing difference measurement between the first cell and a reference cell, and the second measurement may be a RSRP measurement. For example, FIG. 6 shows a UE 602 measuring a DL timing difference with respect to a reference cell. In another example, FIG. 7 shows a UE 702 performing a RSRP measurement at time t2.

In one aspect, at 1212, the UE may transmit a notification indicating that the estimated TA is rejected, where the notification may be transmitted if the estimated TA is rejected for the communication with the first cell. For example, FIG. 9 at 912 shows the UE 902 transmitting a TA invalid notification indicating that the estimated TA has been rejected for communication with the to-be-activated cell 906. For example, FIG. 10 at 1012 shows the UE 1002 transmitting a TA invalid notification indicating that the estimated TA has been rejected for communication with the to-be-activated cell 1006. For example, 1212 may be performed by the TA validation component 198.

In one aspect, the notification may be transmitted via a MAC-CE or UCI. For example, FIG. 9 at 912 shows that the TA invalid notification may be transmitted via a MAC-CE or UCI. For example, FIG. 10 at 1012 shows that the TA invalid notification may be transmitted via a MAC-CE or UCI.

In one aspect, the notification may be associated with an ACK or a NACK. For instance, FIG. 9 at 912 shows the TA invalid notification may be associated with an ACK/NACK message. For instance, FIG. 10 at 1012 shows that the TA invalid notification may be associated with an ACK/NACK message.

In one aspect, at 1214, the UE may receive, subsequent to transmit the notification, a PDCCH order. For example, FIG. 9 at 914A shows the UE 902 receiving a PDCCH ordering a RACH procedure from the SpCell 904. In another example, FIG. 9 at 914B shows the UE 902 receiving a PDCCH ordering a RACH procedure from the to-be-activated cell 906. For example, 1214 may be performed by the TA validation component 198.

In one aspect, at 1216, the UE may initiate a RACH procedure with the first cell based on the PDCCH order. For example, FIG. 9 at 916 shows the UE 902 initiating a RACH procedure with the to-be-activated cell 906. For example, 1216 may be performed by the TA validation component 198.

In one aspect, the RACH procedure with the first cell may be initiated if the first cell is to serve as a SpCell. For example, FIG. 9 at 916 shows that the RACH procedure may be initiated if the to-be-activated cell 906 is to be a new SpCell.

In one aspect, at 1218, the UE may perform, at a third time instance after the second time instance, a third measurement between the first cell and a reference cell, where the third measurement may be performed subsequent to transmitting the notification, and where the third measurement may be a DL timing difference measurement. For example, FIG. 10 at 1011 shows that the UE 1002 may perform measurement(s) after the TA validation at 1010, and the measurement(s) may include a DL timing difference measurement. The third measurement may be a DL timing difference measurement as illustrated in FIG. 7. For example, 1218 may be performed by the TA validation component 198.

In one aspect, at 1220, the UE may transmit an indication of the third measurement via a MAC-CE or UCI. For example, FIG. 10 at 1012 shows the UE 1002 transmitting a TA invalid notification via a MAC-CE or UCI, where the TA invalid notification may include UL sync assistance information. The UL sync assistance information may include the third measurement. In another example, the measurement transmitted by the UE 802 at 812 may include a third measurement. For example, 1220 may be performed by the TA validation component 198.

In one aspect, the third measurement may be included in the notification. For example, FIG. 10 at 1012 shows that the TA invalid notification may include UL sync assistance information. The UL sync assistance information may include the third measurement.

In one aspect, at 1222, the UE may receive, at a fourth time instance after the third time instance, a second estimated TA associated with the first cell. For example, FIG. 10 at 1016 shows that the UE 1002 may receive a new estimated TA. For example, 1222 may be performed by the TA validation component 198.

In one aspect, at 1224, the UE may perform a fourth measurement on the at least one DL-RS. For example, FIG. 10 at 1018 shows that the UE 1002 may perform TA validation. The TA validation performed at 1018 may include performing a measurement as illustrated at 818 of FIG. 8, where the measurement is a fourth measurement. For example, 1224 may be performed by the TA validation component 198.

In one aspect, at 1226, the UE may accept or reject the second estimated TA for the communication with the first cell based on at least one of the third measurement or the fourth measurement. For example, FIG. 10 at 1018 shows that the UE 1002 may perform TA validation. The TA validation performed at 1018 may include accepting or rejecting an estimated TA as illustrated at 820 of FIG. 8, where the estimated TA may be the second estimated TA. For example, 1226 may be performed by the TA validation component 198.

In one aspect, at 1228, the UE may initiate a RACH procedure with the first cell based on a number of TAs being rejected exceeding a threshold number of rejections. For example, FIG. 10 at 1020 shows the UE 1002 determining if a maximum number of TA rejections has been reached and FIG. 10 at 1024 shows the UE 1002 initiating a RACH procedure if the maximum number of TA rejections has been reached. For example, 1228 may be performed by the TA validation component 198.

In one aspect, the first cell may serve as a SpCell or a SCell if the estimated TA is accepted. For example, the first cell may be the to-be-activated cell 906 or the to-be-activated cell 1006 and the to-be-activated cell 906 and the to-be-activated cell 1006 may serve as an SpCell or an SCell. In another example, the deactivated cell 706 in FIG. 7 may serve as an SpCell if the estimated TA is accepted.

Figure 13:
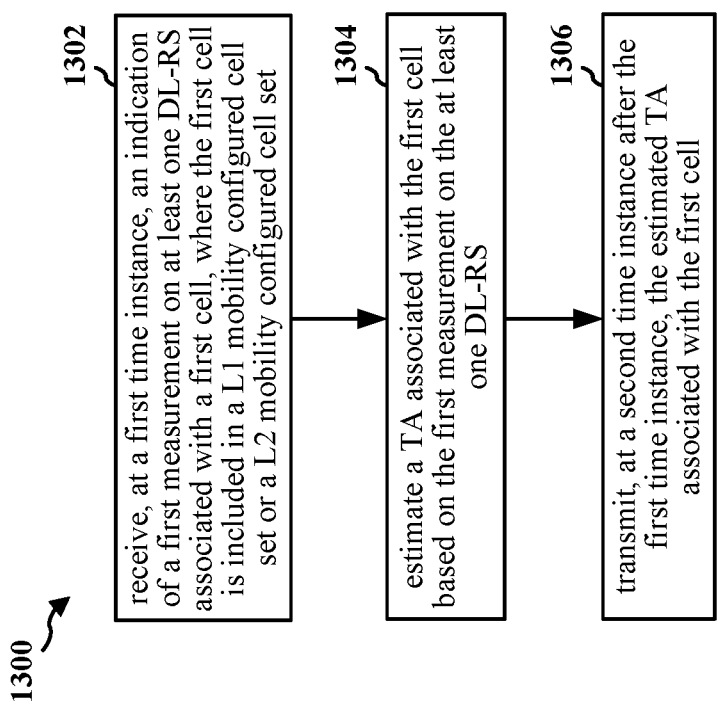
FIG. 13 is a flowchart of a method of wireless communication.

FIG. 13 is a flowchart 1300 of a method of wireless communication. The method may be performed by a network entity (e.g., the base station 102, the CU 110, the DU 130, the RU 140, the base station 310, the base station 804, the network entity 1502, etc.). The method may be performed by the TA component 199. The method may be associated with various technical advantages at the network entity, such as improved communications reliability via an accurate TA.

At 1302, the network entity receives, at a first time instance, an indication of a first measurement on at least one DL-RS associated with a first cell, where the first cell is included in a L1 mobility configured cell set or a L2 mobility configured cell set. For example, FIG. 8 at 812 shows the base station 804 receiving first measurement(s). In an example, the first measurement(s) may be performed on a DL-RS associated with the deactivated cell 706 in FIG. 7. In another example, the first measurement(s) may be a DL timing difference with respect to a reference cell at time t1 as illustrated in FIG. 6. In yet another example, the first cell may be included in the L1/L2 mobility configured cell set 508 illustrated in FIG. 5. For example, 1302 may be performed by the TA component 199.

At 1304, the network entity estimates a TA associated with the first cell based on the first measurement on the at least one DL-RS. For example, FIG. 8 at 814 shows the base station 804 estimating a TA for a cell based on first measurement(s). For example, 1304 may be performed by the TA component 199.

At 1306, the network entity transmits, at a second time instance after the first time instance, the estimated TA associated with the first cell. For example, FIG. 8 at 816 shows the base station 804 transmitting an estimated TA. In an example, the first cell may be the deactivated cell 706 in FIG. 7. For example, 1306 may be performed by the TA component 199.

Figure 14:
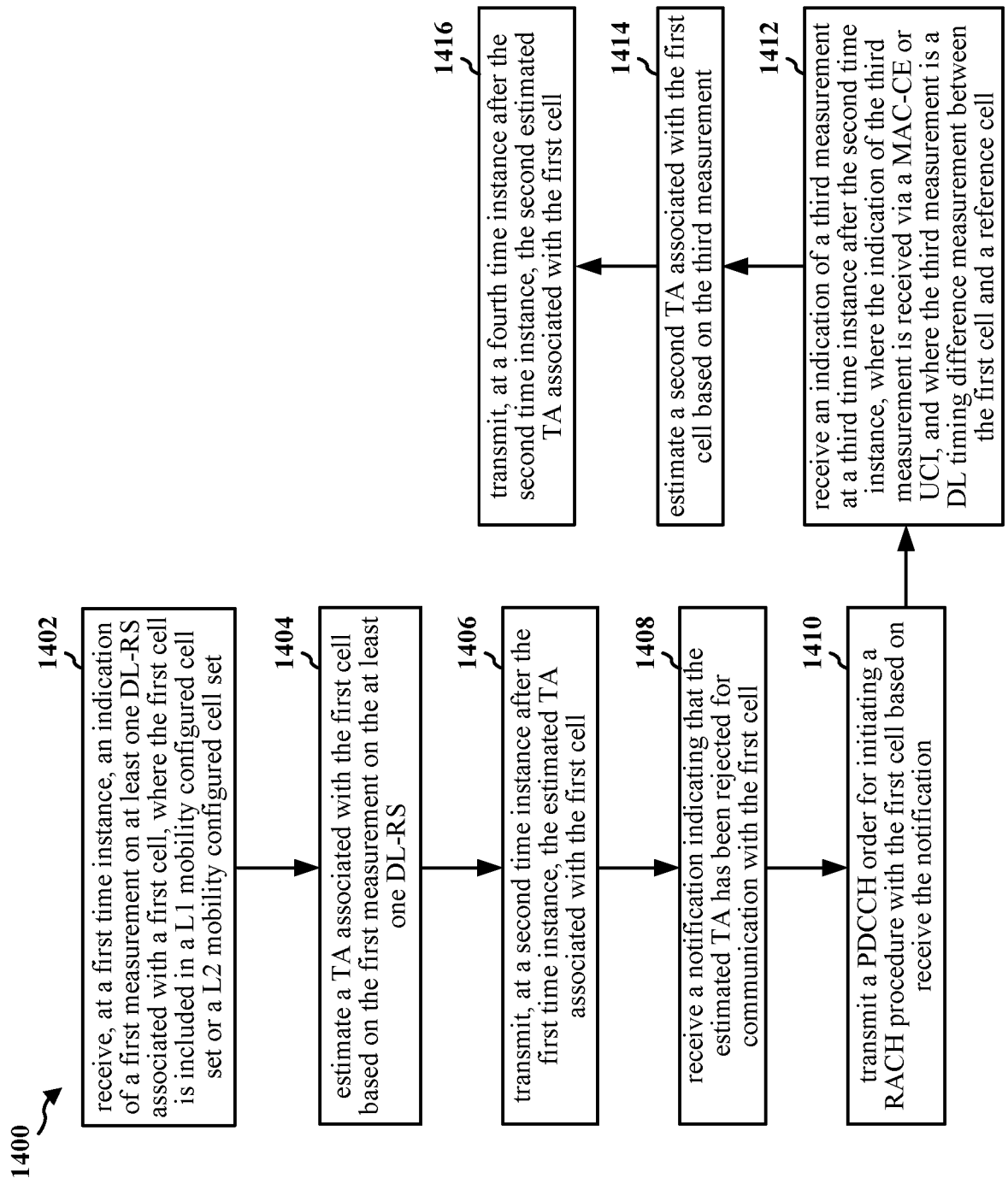
FIG. 14 is a flowchart of a method of wireless communication.

FIG. 14 is a flowchart 1400 of a method of wireless communication. The method may be performed by a network entity (e.g., the base station 102, the CU 110, the DU 130, the RU 140, the base station 310, the base station 804, the network entity 1502, etc.). The method (including the various aspects described below) may be performed by the TA component 199. The method may be associated with various technical advantages at the network entity, such as improved communications reliability via an accurate TA.

At 1402, the network entity receives, at a first time instance, an indication of a first measurement on at least one DL-RS associated with a first cell, where the first cell is included in a L1 mobility configured cell set or a L2 mobility configured cell set. For example, FIG. 8 at 812 shows the base station 804 receiving first measurement(s). In an example, the first measurement(s) may be performed on a DL-RS associated with the deactivated cell 706 in FIG. 7. In another example, the first measurement(s) may be a DL timing difference with respect to a reference cell at time t1 as illustrated in FIG. 6. In yet another example, the first cell may be included in the L1/L2 mobility configured cell set 508 illustrated in FIG. 5. For example, 1402 may be performed by the TA component 199.

At 1404, the network entity estimates a TA associated with the first cell based on the first measurement on the at least one DL-RS. For example, FIG. 8 at 814 shows the base station 804 estimating a TA for a cell based on first measurement(s). For example, 1404 may be performed by the TA component 199.

At 1406, the network entity transmits, at a second time instance after the first time instance, the estimated TA associated with the first cell. For example, FIG. 8 at 816 shows the base station 804 transmitting an estimated TA. In an example, the first cell may be the deactivated cell 706 in FIG. 7. For example, 1406 may be performed by the TA component 199.

In one aspect, the first cell may be a deactivated cell in the L1 mobility configured cell set or the L2 mobility configured cell set, and a second cell may serve as a SpCell. For example, referring to FIG. 7, the first cell may be the deactivated cell 706 and the second cell may be the SpCell 704. In another example, the first cell and the second cell may be in the L1/L2 mobility configured cell set 508 illustrated in FIG. 5.

In one aspect, the first measurement may be a DL timing difference measurement between the first cell and a reference cell. For example, FIG. 6 shows a DL timing difference measurement with respect to a reference cell.

In one aspect, at 1408, the network entity may receive a notification indicating that the estimated TA has been rejected for communication with the first cell. For example, FIG. 9 at 912 shows the SpCell 904 receiving a TA invalid notification indicating that the estimated TA has been rejected for communication with the to-be-activated cell 906. For example, FIG. 10 at 1012 shows the SpCell 1004 receiving a TA invalid notification indicating that the estimated TA has been rejected for communication with the to-be-activated cell 1006. For example, 1408 may be performed by the TA component 199.

In one aspect, the notification may be received via a MAC-CE or UCI. For example, FIG. 9 at 912 shows that the TA invalid notification may be received via a MAC-CE or UCI. For example, FIG. 10 at 1012 shows that the TA invalid notification may be received via a MAC-CE or UCI.

In one aspect, the notification may be associated with an ACK or a NACK. For instance, FIG. 9 at 912 shows the TA invalid notification may be associated with an ACK/NACK message. For instance, FIG. 10 at 1012 shows the TA invalid notification may be associated with an ACK/NACK message.

In one aspect, at 1410, the network entity may transmit a PDCCH order for initiating a RACH procedure with the first cell based on receiving the notification. For example, FIG. 9 at 914A shows the SpCell 904 transmitting a PDCCH order for initiating a RACH procedure with the to-be-activated cell 906. For example, 1410 may be performed by the TA component 199.

In one aspect, at 1412, the network entity may receive an indication of a third measurement at a third time instance after the second time instance, where the indication of the third measurement may be received via a MAC-CE or UCI, and where the third measurement may be a DL timing difference measurement between the first cell and a reference cell. For example, FIG. 10 at 1012 shows the SpCell 1004 receiving a TA invalid notification including UL sync assistance information. The UL sync assistance information may include a third measurement, where the third measurement is a DL timing difference. FIG. 10 at 1012 also shows the third measurement may be received via a MAC-CE or UCI. In yet another example, the SpCell 1004 may receive the third measurement separately. For example, 1412 may be performed by the TA component 199.

In one aspect, the third measurement may be included in the notification. For example, FIG. 10 at 1012 shows that the TA invalid notification may include UL sync assistance information that may include the measurement.

In one aspect, at 1414, the network entity may estimate a second TA associated with the first cell based on the third measurement. For example, FIG. 10 at 1014 shows the SpCell 1004 estimating a new TA based on the UL sync assistance information. For example, 1414 may be performed by the TA component 199.

In one aspect, at 1416, the network entity may transmit, at a fourth time instance after the second time instance, the second estimated TA associated with the first cell. For example, FIG. 10 at 1016 shows the SpCell 1004 transmitting a new estimated TA for the to-be-activated cell 1006. For example, 1416 may be performed by the TA component 199.

In one aspect, the first cell may serve as a new SpCell or a SCell if the estimated TA is accepted. For example, the first cell may be the to-be-activated cell 906 or the to-be-activated cell 1006 and the to-be-activated cell 906 and the to-be-activated cell 1006 may serve as an SpCell or an SCell. In another example, the deactivated cell 706 in FIG. 7 may serve as an SpCell if the estimated TA is accepted.

Figure 15:
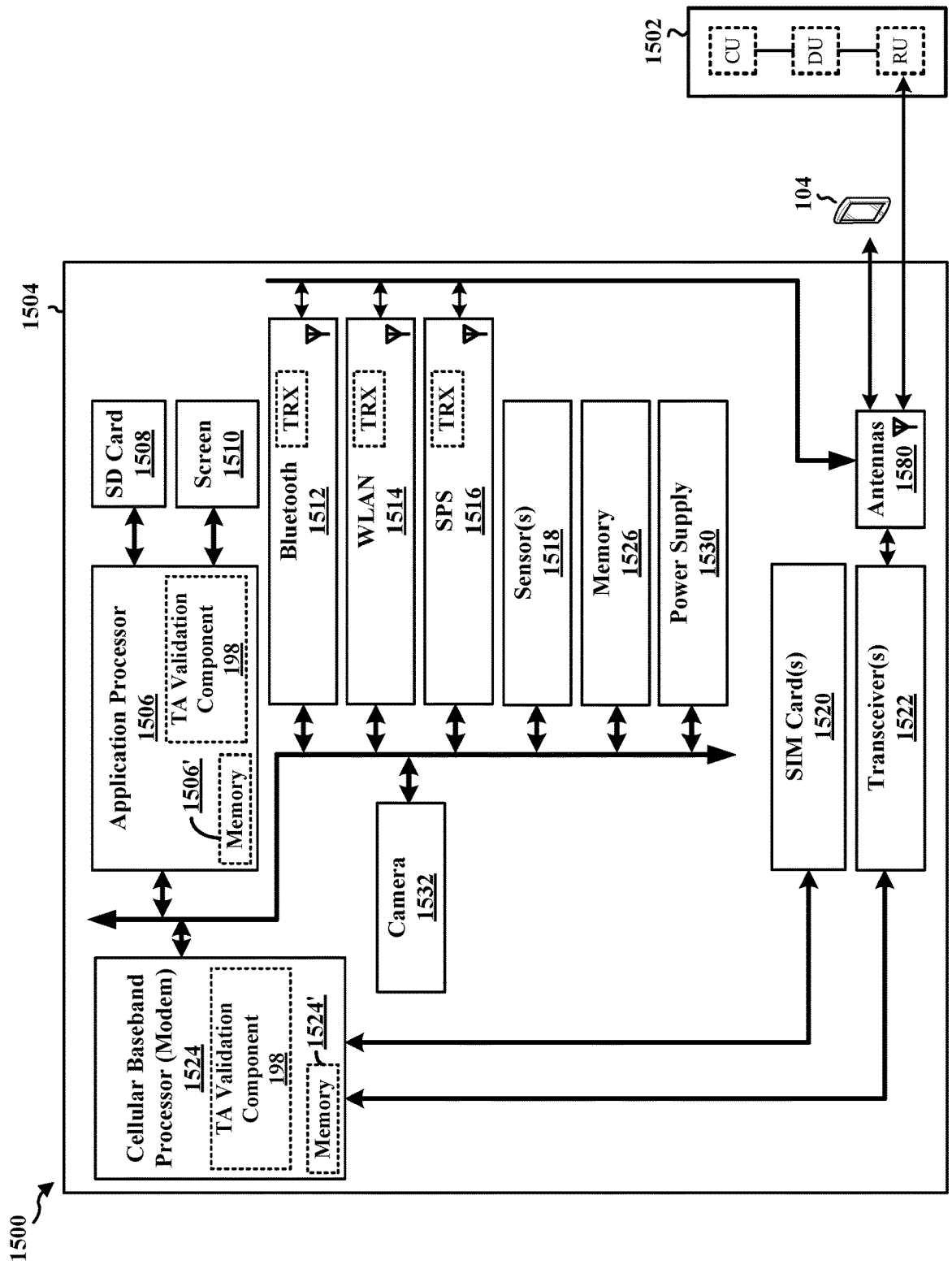
FIG. 15 is a diagram illustrating an example of a hardware implementation for an example apparatus and/or network entity.

FIG. 15 is a diagram 1500 illustrating an example of a hardware implementation for an apparatus 1504. The apparatus 1504 may be a UE, a component of a UE, or may implement UE functionality. In some aspects, the apparatus 1504 may include a cellular baseband processor 1524 (also referred to as a modem) coupled to one or more transceivers 1522 (e.g., cellular RF transceiver). The cellular baseband processor 1524 may include on-chip memory 1524'. In some aspects, the apparatus 1504 may further include one or more subscriber identity modules (SIM) cards 1520 and an application processor 1506 coupled to a secure digital (SD) card 1508 and a screen 1510. The application processor 1506 may include on-chip memory 1506'. In some aspects, the apparatus 1504 may further include a Bluetooth module 1512, a WLAN module 1514, an SPS module 1516 (e.g., GNSS module), one or more sensor modules 1518 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1526, a power supply 1530, and/or a camera 1532. The Bluetooth module 1512, the WLAN module 1514, and the SPS module 1516 may include an on-chip transceiver (TRX) (or in some cases, just a receiver (RX)). The Bluetooth module 1512, the WLAN module 1514, and the SPS module 1516 may include their own dedicated antennas and/or utilize the antennas 1580 for communication. The cellular baseband processor 1524 communicates through the transceiver(s) 1522 via one or more antennas 1580 with the UE 104 and/or with an RU associated with a network entity 1502. The cellular baseband processor 1524 and the application processor 1506 may each include a computer-readable medium/memory 1524', 1506', respectively. The additional memory modules 1526 may also be considered a computer-readable medium/memory. Each computer-readable medium/memory 1524', 1506', 1526 may be non-transitory. The cellular baseband processor 1524 and the application processor 1506 are each responsible for general processing, including the execution of software stored on the computer-readable medium/memory. The software, when executed by the cellular baseband processor 1524/application processor 1506, causes the cellular baseband processor 1524/application processor 1506 to perform the various functions described supra. The computer-readable medium/memory may also be used for storing data that is manipulated by the cellular baseband processor 1524/application processor 1506 when executing software. The cellular baseband processor 1524/application processor 1506 may be a component of the UE 350 and may include the memory 360 and/or at least one of the TX processor 368, the RX processor 356, and the controller/processor 359. In one configuration, the apparatus 1504 may be a processor chip (modem and/or application) and include just the cellular baseband processor 1524 and/or the application processor 1506, and in another configuration, the apparatus 1504 may be the entire UE (e.g., see 350 of FIG. 3) and include the additional modules of the apparatus 1504.

As discussed supra, the TA validation component 198 is configured to transmit, at a first time instance, an indication of a first measurement on at least one DL-RS associated with a first cell, where the first cell is included in a L1 mobility configured cell set or a L2 mobility configured cell set. The TA validation component 198 is also configured to receive, at a second time instance after the first time instance, an estimated TA associated with the first cell. The TA validation component 198 is also configured to perform a second measurement on the at least one DL-RS. The TA validation component 198 is also configured to accept or reject the estimated TA for communication with the first cell based on at least one of the first measurement or the second measurement. The TA validation component 198 may be within the cellular baseband processor 1524, the application processor 1506, or both the cellular baseband processor 1524 and the application processor 1506. The TA validation component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1504 may include a variety of components configured for various functions. In one configuration, the apparatus 1504, and in particular the cellular baseband processor 1524 and/or the application processor 1506, includes means for transmitting, at a first time instance, an indication of a first measurement on at least one DL-RS associated with a first cell, where the first cell is included in a L1 mobility configured cell set or a L2 mobility configured cell set. In one configuration, the apparatus 1504, and in particular the cellular baseband processor 1524 and/or the application processor 1506, includes means for receiving, at a second time instance after the first time instance, an estimated TA associated with the first cell. In one configuration, the apparatus 1504, and in particular the cellular baseband processor 1524 and/or the application processor 1506, includes means for performing a second measurement on the at least one DL-RS. In one configuration, the apparatus 1504, and in particular the cellular baseband processor 1524 and/or the application processor 1506, includes means for accepting or rejecting the estimated TA for communication with the first cell based on at least one of the first measurement or the second measurement. In one configuration, the apparatus 1504, and in particular the cellular baseband processor 1524 and/or the application processor 1506, includes means for performing the first measurement on the at least one DL-RS prior to the first time instance, where the indication of the first measurement is transmitted based on the performed first measurement. In one configuration, the apparatus 1504, and in particular the cellular baseband processor 1524 and/or the application processor 1506, includes means for transmitting a notification indicating that the estimated TA is rejected, where the notification is transmitted if the estimated TA is rejected for the communication with the first cell. In one configuration, the apparatus 1504, and in particular the cellular baseband processor 1524 and/or the application processor 1506, includes means for receiving, subsequent to transmitting the notification, a PDCCH order. In one configuration, the apparatus 1504, and in particular the cellular baseband processor 1524 and/or the application processor 1506, includes means for initiating a RACH procedure with the first cell based on the PDCCH order. In one configuration, the apparatus 1504, and in particular the cellular baseband processor 1524 and/or the application processor 1506, includes means for performing, at a third time instance after the second time instance, a third measurement between the first cell and a reference cell, where the third measurement is performed subsequent to transmitting the notification, and where the third measurement is a DL timing difference measurement. In one configuration, the apparatus 1504, and in particular the cellular baseband processor 1524 and/or the application processor 1506, includes means for transmitting an indication of the third measurement via a MAC-CE or UCI. In one configuration, the apparatus 1504, and in particular the cellular baseband processor 1524 and/or the application processor 1506, includes means for receiving, at a fourth time instance after the third time instance, a second estimated TA associated with the first cell. In one configuration, the apparatus 1504, and in particular the cellular baseband processor 1524 and/or the application processor 1506, includes means for performing a fourth measurement on the at least one DL-RS. In one configuration, the apparatus 1504, and in particular the cellular baseband processor 1524 and/or the application processor 1506, includes means for accepting or rejecting the second estimated TA for the communication with the first cell based on at least one of the third measurement or the fourth measurement. In one configuration, the apparatus 1504, and in particular the cellular baseband processor 1524 and/or the application processor 1506, includes means for initiating a RACH procedure with the first cell based on a number of TAs being rejected exceeding a threshold number of rejections. The means may be the TA validation component 198 of the apparatus 1504 configured to perform the functions recited by the means. As described supra, the apparatus 1504 may include the TX processor 368, the RX processor 356, and the controller/processor 359. As such, in one configuration, the means may be the TX processor 368, the RX processor 356, and/or the controller/processor 359 configured to perform the functions recited by the means.

Figure 16:
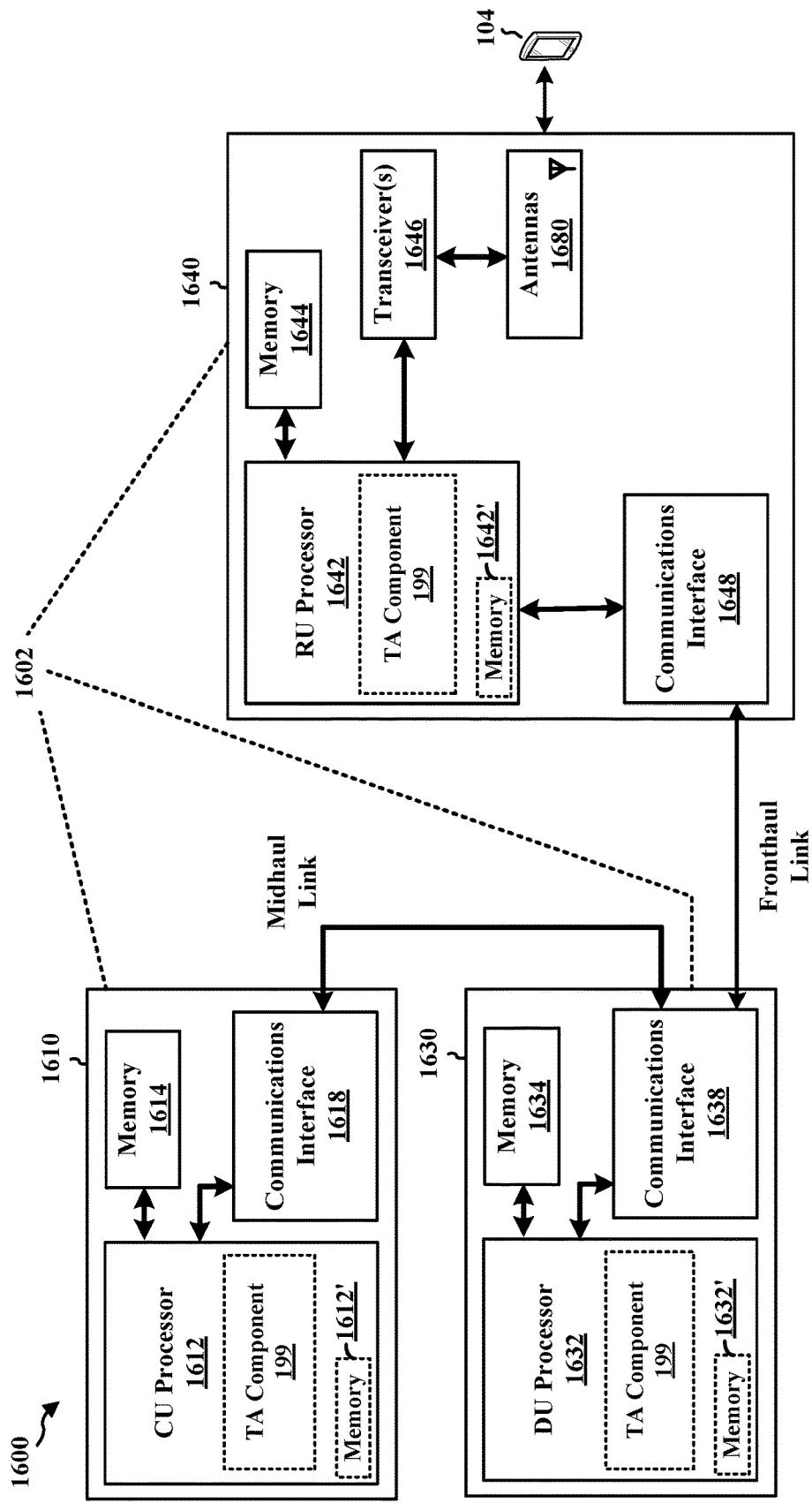
FIG. 16 is a diagram illustrating an example of a hardware implementation for an example network entity.

FIG. 16 is a diagram 1600 illustrating an example of a hardware implementation for a network entity 1602. The network entity 1602 may be a BS, a component of a BS, or may implement BS functionality. The network entity 1602 may include at least one of a CU 1610, a DU 1630, or an RU 1640. For example, depending on the layer functionality handled by the TA component 199, the network entity 1602 may include the CU 1610; both the CU 1610 and the DU 1630; each of the CU 1610, the DU 1630, and the RU 1640; the DU 1630; both the DU 1630 and the RU 1640; or the RU

1640. The CU 1610 may include a CU processor 1612. The CU processor 1612 may include on-chip memory 1612'. In some aspects, the CU 1610 may further include additional memory modules 1614 and a communications interface 1618. The CU 1610 communicates with the DU 1630 through a midhaul link, such as an F1 interface. The DU 1630 may include a DU processor 1632. The DU processor 1632 may include on-chip memory 1632'. In some aspects, the DU 1630 may further include additional memory modules 1634 and a communications interface 1638. The DU 1630 communicates with the RU 1640 through a fronthaul link. The RU 1640 may include an RU processor 1642. The RU processor 1642 may include on-chip memory 1642'. In some aspects, the RU 1640 may further include additional memory modules 1644, one or more transceivers 1646, antennas 1680, and a communications interface 1648. The RU 1640 communicates with the UE 104. The on-chip memory 1612', 1632', 1642' and the additional memory modules 1614, 1634, 1644 may each be considered a computer-readable medium/memory. Each computer-readable medium/memory may be non-transitory. Each of the processors 1612, 1632, 1642 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the TA component 199 is configured to receive, at a first time instance, an indication of a first measurement on at least one DL-RS associated with a first cell, where the first cell is included in a L1 mobility configured cell set or a L2 mobility configured cell set. The TA component 199 is configured to estimate a TA associated with the first cell based on the first measurement on the at least one DL-RS. The TA component 199 is configured to transmit, at a second time instance after the first time instance, the estimated TA associated with the first. The TA component 199 may be within one or more processors of one or more of the CU 1610, DU 1630, and the RU 1640. The TA component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1602 may include a variety of components configured for various functions. In one configuration, the network entity 1602 includes means for receiving, at a first time instance, an indication of a first measurement on at least one DL-RS associated with a first cell, where the first cell is included in a L1 mobility configured cell set or a L2 mobility configured cell set. In one configuration, the network entity 1602 includes means for estimating a TA associated with the first cell based on the first measurement on the at least one DL-RS. In one configuration, the network entity 1602 includes means for transmitting, at a second time instance after the first time instance, the estimated TA associated with the first cell. In one configuration, the network entity 1602 includes means for receiving a notification indicating that the estimated TA has been rejected for communication with the first cell. In one configuration, the network entity 1602 includes means for transmitting a PDCCH order for initiating a RACH procedure with the first cell based on receiving the notification. In one configuration, the network entity 1602 includes means for receiving an indication of a third measurement at a third time instance after the second time instance, where the indication of the third measurement is received via a MAC-CE or UCI, and where the third measurement is a DL timing difference measurement between the first cell and a reference cell. In one configuration, the network entity 1602 includes means for estimating a second TA associated with the first cell based on the third measurement. In one configuration, the network entity 1602 includes means for transmitting, at a fourth time instance after the second time instance, the second estimated TA associated with the first cell. The means may be the TA component 199 of the network entity 1602 configured to perform the functions recited by the means. As described supra, the network entity 1602 may include the TX processor 316, the RX processor 370, and the controller/processor 375. As such, in one configuration, the means may be the TX processor 316, the RX processor 370, and/or the controller/processor 375 configured to perform the functions recited by the means.

A UE may apply a TA for UL transmissions with a cell to account for propagation delays between the UE and the cell. When the UE receives signaling from a network to connect to a to-be-activated cell in a L1/L2 mobility configured cell set, the network may provide an estimated TA to the UE, where the estimated TA may be based on a measurement report transmitted by the UE to the network. However, the estimated TA may be inaccurate for various reasons. In one example, channel strength may have changed between a time at which the UE last transmitted a measurement report and a time at which the estimated TA is obtained, which may lead to the estimated TA being inaccurate. In another example, the UE may not transmit measurement reports frequently enough to enable the network to accurately generate the estimated TA. In yet another example, the estimated TA may be inaccurate due to UE mobility, that is, a time at which the UE applies the estimated TA may be too far away from a time at which the network generates the estimated TA. Applying an inaccurate TA for UL transmissions may impact communications reliability.

Various techniques for UE-side TA validation are described herein that may utilize RSRP measurements to represent channel strength. In an example, a UE transmits, at a first time instance, an indication of a first measurement on at least one DL-RS associated with a first cell, where the first cell is included in a L1 mobility configured cell set or a L2 mobility configured cell set. The UE receives, at a second time instance after the first time instance, an estimated TA associated with the first cell. The UE performs a second measurement on the at least one DL-RS. The UE accepts or rejects the estimated TA for communication with the first cell based on at least one of the first measurement or the second measurement. Via the aforementioned TA validation procedure, the UE may be able to reject inaccurate TAs. As such, the TA validation procedure may lead to increased communications reliability.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a user equipment (UE), including: transmitting, at a first time instance, an indication of a first measurement on at least one downlink reference signal (DL-RS) associated with a first cell, where the first cell is included in a layer 1 (L1) mobility configured cell set or a layer 2 (L2) mobility configured cell set; receiving, at a second time instance after the first time instance, an estimated timing advance (TA) associated with the first cell; performing a second measurement on the at least one DL-RS; and accepting or rejecting the estimated TA for communication with the first cell based on at least one of the first measurement or the second measurement.

Aspect 2 is the method of aspect 1, where the estimated TA is accepted or rejected further based on at least one of: a difference between the first measurement and the second measurement, or a reference signal received power (RSRP) threshold for the first cell associated with the second measurement.

Aspect 3 is the method of any of aspects 1-2, further including: performing the first measurement on the at least one DL-RS prior to the first time instance, where the indication of the first measurement is transmitted based on the performed first measurement.

Aspect 4 is the method of any of aspects 1-3, where the first cell is a deactivated cell in the L1 mobility configured cell set or the L2 mobility configured cell set, where a second cell is serving as a special cell (SpCell) prior to accepting or rejecting the estimated TA.

Aspect 5 is the method of any of aspects 1-4, where the first measurement is a DL timing difference measurement between the first cell and a reference cell, and where the second measurement is a reference signal received power (RSRP) measurement.

Aspect 6 is the method of any of aspects 1-5, further including: transmitting a notification indicating that the estimated TA is rejected, where the notification is transmitted if the estimated TA is rejected for the communication with the first cell.

Aspect 7 is the method of aspect 6, where the notification is transmitted via a medium access control (MAC) control element (MAC-CE) or uplink control information (UCI).

Aspect 8 is the method of aspect 6, where the notification is associated with an acknowledgement (ACK) or a negative acknowledgment (NACK).

Aspect 9 is the method of aspects 6-7 or aspects 6 and 8, further including: receiving, subsequent to transmitting the notification, a physical downlink control channel (PDCCH) order; and initiating a random access channel (RACH) procedure with the first cell based on the PDCCH order.

Aspect 10 is the method of aspect 9, where the RACH procedure with the first cell is initiated if the first cell is to serve as a special cell (SpCell).

Aspect 11 is the method of aspect 6, further including: performing, at a third time instance after the second time instance, a third measurement between the first cell and a reference cell, where the third measurement is performed subsequent to transmitting the notification, and where the third measurement is a DL timing difference measurement.

Aspect 12 is the method of aspect 11, further including: transmitting an indication of the third measurement via a medium access control (MAC) control element (MAC-CE) or uplink control information (UCI).

Aspect 13 is the method of aspect 11, where the third measurement is included in the notification.

Aspect 14 is the method of aspects 11-12 or aspects 11 and 13, further including: receiving, at a fourth time instance after the third time instance, a second estimated TA associated with the first cell; performing a fourth measurement on the at least one DL-RS; and accepting or rejecting the second estimated TA for the communication with the first cell based on at least one of the third measurement or the fourth measurement.

Aspect 15 is the method of aspect 14, further including: initiating a random access channel (RACH) procedure with the first cell based on a number of TAs being rejected exceeding a threshold number of rejections.

Aspect 16 is the method of any of aspects 1-15 where the first cell serves as a new special cell (SpCell) or a secondary cell (SCell) if the estimated TA is accepted.

Aspect 17 is an apparatus for wireless communication at a user equipment (UE) including a memory and at least one processor coupled to the memory and based at least in part on information stored in the memory, the at least one processor is configured to perform a method in accordance with any of aspects 1-16.

Aspect 18 is an apparatus for wireless communications, including means for performing a method in accordance with any of aspects 1-16.

Aspect 19 is the apparatus of aspect 17 or 18 further including at least one of a transceiver or an antenna coupled to the at least one processor, where at least one of the transceiver or the antenna is configured to transmit the indication of the first measurement and receive the estimated TA associated with the first cell.

Aspect 20 is a non-transitory computer-readable medium including instructions that, when executed by an apparatus, cause the apparatus to perform a method in accordance with any of aspects 1-16.

Aspect 21 is a method of wireless communication at a network entity, including: receiving, at a first time instance, an indication of a first measurement on at least one downlink reference signal (DL-RS) associated with a first cell, where the first cell is included in a layer 1 (L1) mobility configured cell set or a layer 2 (L2) mobility configured cell set; estimating a timing advance (TA) associated with the first cell based on the first measurement on the at least one DL-RS; and transmitting, at a second time instance after the first time instance, the estimated TA associated with the first cell.

Aspect 22 is the method of aspect 21, where the first cell is a deactivated cell in the L1 mobility configured cell set or the L2 mobility configured cell set, where a second cell is serving as a special cell (SpCell).

Aspect 23 is the method of any of aspects 21-22, where the first measurement is a DL timing difference measurement between the first cell and a reference cell.

Aspect 24 is the method of any of aspects 21-23, further including: receiving a notification indicating that the estimated TA has been rejected for communication with the first cell.

Aspect 25 is the method of aspect 24, where the notification is received via a medium access control (MAC) control element (MAC-CE) or uplink control information (UCI).

Aspect 26 is the method of aspect 24, where the notification is associated with an acknowledgement (ACK) or a negative acknowledgment (NACK).

Aspect 27 is the method of aspects 24-25 or aspects 24 and 26, further including: transmitting a physical downlink control channel (PDCCH) order for initiating a random access channel (RACH) procedure with the first cell based on receiving the notification.

Aspect 28 is the method of aspect 24, further including: receiving an indication of a third measurement at a third time instance after the second time instance, where the indication of the third measurement is received via a medium access control (MAC) control element (MAC-CE) or uplink control information (UCI), and where the third measurement is a DL timing difference measurement between the first cell and a reference cell.

Aspect 29 is the method of aspect 28, where the third measurement is included in the notification.

Aspect 30 is the method of any of aspects 28-29, further including: estimating a second TA associated with the first cell based on the third measurement; and transmitting, at a fourth time instance after the second time instance, the second estimated TA associated with the first cell.

Aspect 31 is the method of any of aspects 21-30 where the first cell serves as a new special cell (SpCell) or a secondary cell (SCell) if the estimated TA is accepted.

Aspect 32 is an apparatus for wireless communication at a user equipment (UE) including a memory and at least one processor coupled to the memory and based at least in part on information stored in the memory, the at least one processor is configured to perform a method in accordance with any of aspects 21-31.

Aspect 33 is an apparatus for wireless communications, including means for performing a method in accordance with any of aspects 21-31.

Aspect 34 is the apparatus of aspect 32 or 33 further including at least one of a transceiver or an antenna coupled to the at least one processor, where at least one of the transceiver or the antenna is configured to receive the indication of the first measurement and transmit the estimated TA.

Aspect 35 is a non-transitory computer-readable medium including instructions that, when executed by an apparatus, cause the apparatus to perform a method in accordance with any of aspects 21-31.

What is claimed is:

1. An apparatus for wireless communication at a user equipment (UE), comprising:
   memory; and
   at least one processor coupled to the memory and, based at least in part on information stored in the memory, the at least one processor is configured to:
   transmit, at a first time instance, an indication of a first measurement on at least one downlink reference signal (DL-RS) associated with a first cell, wherein the first cell is included in a layer 1 (L1) mobility configured cell set or a layer 2 (L2) mobility configured cell set;
   receive, at a second time instance after the first time instance, an estimated timing advance (TA) associated with the first cell;
   perform a second measurement on the at least one DL-RS; and
   accept or reject the estimated TA for communication with the first cell based on at least one of the first measurement or the second measurement.

2. The apparatus of claim 1, wherein the estimated TA is accepted or rejected further based on at least one of: a difference between the first measurement and the second measurement, or a reference signal received power (RSRP) threshold for the first cell associated with the second measurement.

3. The apparatus of claim 1, wherein the at least one processor is further configured to:
   perform the first measurement on the at least one DL-RS prior to the first time instance, wherein the indication of the first measurement is transmitted based on the performed first measurement.

4. The apparatus of claim 1, wherein the first cell is a deactivated cell in the L1 mobility configured cell set or the L2 mobility configured cell set, wherein a second cell is serving as a special cell (SpCell) prior to accept or reject the estimated TA.

5. The apparatus of claim 1, wherein the first measurement is a DL timing difference measurement between the first cell and a reference cell, and wherein the second measurement is a reference signal received power (RSRP) measurement.

6. The apparatus of claim 1, wherein the at least one processor is further configured to:
transmit a notification indicating that the estimated TA is rejected, wherein the notification is transmitted if the estimated TA is rejected for the communication with the first cell.

7. The apparatus of claim 6, wherein the notification is transmitted via a medium access control (MAC) control element (MAC-CE) or uplink control information (UCI).

8. The apparatus of claim 6, wherein the notification is associated with an acknowledgement (ACK) or a negative acknowledgment (NACK).

9. The apparatus of claim 6, wherein the at least one processor is further configured to:
receive, subsequent to transmit the notification, a physical downlink control channel (PDCCH) order; and
initiate a random access channel (RACH) procedure with the first cell based on the PDCCH order.

10. The apparatus of claim 9, wherein the RACH procedure with the first cell is initiated if the first cell is to serve as a special cell (SpCell).

11. The apparatus of claim 6, wherein the at least one processor is further configured to:
perform, at a third time instance after the second time instance, a third measurement between the first cell and a reference cell, wherein the third measurement is performed subsequent to transmit the notification, and wherein the third measurement is a DL timing difference measurement.

12. The apparatus of claim 11, wherein the at least one processor is further configured to:
transmit an indication of the third measurement via a medium access control (MAC) control element (MAC-CE) or uplink control information (UCI).

13. The apparatus of claim 11, wherein the third measurement is included in the notification.

14. The apparatus of claim 11, wherein the at least one processor is further configured to:
receive, at a fourth time instance after the third time instance, a second estimated TA associated with the first cell;
perform a fourth measurement on the at least one DL-RS; and
accept or reject the second estimated TA for the communication with the first cell based on at least one of the third measurement or the fourth measurement.

15. The apparatus of claim 14, wherein the at least one processor is further configured to:
initiate a random access channel (RACH) procedure with the first cell based on a number of TAs being rejected exceeding a threshold number of rejections.

16. The apparatus of claim 1, wherein the first cell serves as a new special cell (SpCell) or a secondary cell (SCell) if the estimated TA is accepted.

17. The apparatus of claim 1, further comprising at least one of a transceiver or an antenna coupled to the at least one processor, wherein at least one of the transceiver or the antenna is configured to: transmit the indication of the first measurement and receive the estimated TA.

18. A method of wireless communication at a user equipment (UE), comprising:
transmitting, at a first time instance, an indication of a first measurement on at least one downlink reference signal (DL-RS) associated with a first cell, wherein the first cell is included in a layer 1 (L1) mobility configured cell set or a layer 2 (L2) mobility configured cell set;
receiving, at a second time instance after the first time instance, an estimated timing advance (TA) associated with the first cell;
performing a second measurement on the at least one DL-RS; and
accepting or rejecting the estimated TA for communication with the first cell based on at least one of the first measurement or the second measurement.

19. An apparatus for wireless communication at a network entity, comprising:
memory; and
at least one processor coupled to the memory and, based at least in part on information stored in the memory, the at least one processor is configured to:
receive, at a first time instance, an indication of a first measurement on at least one downlink reference signal (DL-RS) associated with a first cell, wherein the first cell is included in a layer 1 (L1) mobility configured cell set or a layer 2 (L2) mobility configured cell set;
estimate a timing advance (TA) associated with the first cell based on the first measurement on the at least one DL-RS; and
transmit, at a second time instance after the first time instance, the estimated TA associated with the first cell.

20. The apparatus of claim 19, wherein the first cell is a deactivated cell in the L1 mobility configured cell set or the L2 mobility configured cell set, wherein a second cell is serving as a special cell (SpCell).

21. The apparatus of claim 19, wherein the first measurement is a DL timing difference measurement between the first cell and a reference cell.

22. The apparatus of claim 19, wherein the at least one processor is further configured to:
receive a notification indicating that the estimated TA has been rejected for communication with the first cell.

23. The apparatus of claim 22, wherein the notification is received via a medium access control (MAC) control element (MAC-CE) or uplink control information (UCI).

24. The apparatus of claim 22, wherein the notification is associated with an acknowledgement (ACK) or a negative acknowledgment (NACK).

25. The apparatus of claim 22, wherein the at least one processor is further configured to:
transmit a physical downlink control channel (PDCCH) order for initiating a random access channel (RACH) procedure with the first cell based on receive the notification.

26. The apparatus of claim 22, wherein the at least one processor is further configured to:
receive an indication of a third measurement at a third time instance after the second time instance, wherein the indication of the third measurement is received via a medium access control (MAC) control element (MAC-CE) or uplink control information (UCI), and wherein the third measurement is a DL timing difference measurement between the first cell and a reference cell.

27. The apparatus of claim 26, wherein the third measurement is included in the notification.

28. The apparatus of claim 26, wherein the at least one processor is further configured to:
estimate a second TA associated with the first cell based on the third measurement; and transmit, at a fourth time instance after the second time instance, the second estimated TA associated with the first cell.

29. The apparatus of claim 19, further comprising at least one of a transceiver or an antenna coupled to the at least one processor, wherein at least one of the transceiver or the antenna is configured to: receive the indication of the first measurement and transmit the estimated TA.

30. A method of wireless communication at a network entity, comprising:
   receiving, at a first time instance, an indication of a first measurement on at least one downlink reference signal (DL-RS) associated with a first cell, wherein the first cell is included in a layer 1 (L1) mobility configured cell set or a layer 2 (L2) mobility configured cell set;
   estimating a timing advance (TA) associated with the first cell based on the first measurement on the at least one DL-RS; and
   transmitting, at a second time instance after the first time instance, the estimated TA associated with the first cell.

* * * * *